US008892719B2

(12) United States Patent
Lockhart et al.

(10) Patent No.: US 8,892,719 B2
(45) Date of Patent: Nov. 18, 2014

(54) METHOD AND APPARATUS FOR MONITORING NETWORK SERVERS

(75) Inventors: Arthur Lockhart, Aliso Viejo, CA (US); Gregory Hill, Aliso Viejo, CA (US)

(73) Assignee: Alpha Technical Corporation, Aliso Viejo, CA (US)

( * ) Notice: Subject to any disclaimer, the term of this patent is extended or adjusted under 35 U.S.C. 154(b) by 1145 days.

(21) Appl. No.: 12/200,663

(22) Filed: Aug. 28, 2008

(65) Prior Publication Data

US 2009/0063509 A1   Mar. 5, 2009

Related U.S. Application Data

(60) Provisional application No. 60/967,102, filed on Aug. 30, 2007.

(51) Int. Cl.
*G06F 15/173* (2006.01)
*H04L 12/24* (2006.01)
*H04L 12/26* (2006.01)

(52) U.S. Cl.
CPC ............ *H04L 41/0681* (2013.01); *H04L 43/10* (2013.01); *H04L 43/106* (2013.01); *H04L 43/0817* (2013.01)
USPC ............................ 709/224; 709/225; 719/318

(58) Field of Classification Search
USPC .......................................................... 709/224
See application file for complete search history.

(56) References Cited

U.S. PATENT DOCUMENTS

| | | | |
|---|---|---|---|
| 6,052,694 A * | 4/2000 | Bromberg | 1/1 |
| 6,738,757 B1 | 5/2004 | Wynne et al. | 707/3 |
| 6,950,848 B1 | 9/2005 | Yousefi'zadeh | 709/203 |
| 2006/0041660 A1* | 2/2006 | Bishop et al. | 709/224 |
| 2006/0106851 A1 | 5/2006 | Warshawsky | 707/101 |
| 2007/0088706 A1* | 4/2007 | Goff | 707/10 |

OTHER PUBLICATIONS

Kung, H. T. and Lehman, P L., "Systolic (VLSI) Array for Relational Database Operations", Proceedings of ACM-SIGMOD 1980, May 1980, pp. 105-116.*
Kung, H.T., Why Systolic Architectures?, IEEE Computer, pp. 37-46, vol. 15, No. 1, Jan. 1982.

* cited by examiner

*Primary Examiner* — Viet Vu
*Assistant Examiner* — Herman Belcher
(74) *Attorney, Agent, or Firm* — K. David Crockett, Esq.; Paul J. Backofen, Esq.; Crockett & Crockett, PC

(57) ABSTRACT

A server monitoring system includes one or more monitoring engines running on a computer, a system database running on a computer, and a user interface running on a computer to remotely monitor one or more servers across any suitable network and provide alerts and status via either user interface computer or a suitable remote notification system.

5 Claims, 17 Drawing Sheets

| | 100 ↓ | 105 ↓ | 106 ↓ | 107 108 ↓ | 109a ↓ | 109b ↓ |
|---|---|---|---|---|---|---|
| | ROW TYPE | DBMS ID | PACKET SEQUENCE NO | SCRIPT ID | MONITORING DATA COLUMNS | |
| 101 → | Header | A | B | C | null | null |
| 102a → | Data | A | B | C | D | E |
| 102b → | Data | A | B | C | D | E |
| 103 → | Footer | A | B | C | null | null |

METHOD AND APPARATUS FOR MONITORING NETWORK SERVERS

RELATED APPLICATIONS

This application claims priority from copending U.S. provisional patent application 60/967,102 filed Aug. 30, 2007.

FIELD OF THE INVENTIONS

The inventions described below relate to the field of automated monitoring for a plurality of database servers, and more particularly, to a parallel systolic processing architecture to automatically and remotely monitor a plurality of network database servers.

BACKGROUND OF THE INVENTIONS

Database Management Systems (DBMS) have become increasingly important to business and industry. Many organizations now depend on DBMS applications made available to workers and consumers over private networks and through the public Internet. The DBMS servers that power these applications are vulnerable to system failures and must therefore be continually monitored to track performance and ensure DBMS availability. DBMS monitoring is an inherently difficult, time-consuming and costly activity that requires substantial human intervention, particularly for organizations that support multiple DBMS servers and applications. There presently exists no scalable, comprehensive and fully-automated solution for monitoring DBMS servers. Organizations that support DBMS servers must therefore either tolerate periodic system outages or expend substantial time, effort, and labor on DBMS monitoring activities.

SUMMARY

A server monitoring system includes one or more monitoring engines running on a computer, a system database running on a computer, and a user interface running on a computer to remotely monitor one or more servers across any suitable network and provide alerts and status via either user interface computer or a suitable remote notification system.

The network server monitoring technique employs an automated, multithreaded software engine to monitor a plurality of DBMS servers using precisely timed multiple parallel processes. Each monitoring process operates asynchronously in a continuous loop and executes monitoring scripts against a single DBMS server, in the native language of the DBMS server, at periodic intervals. Multiple monitoring processes are precision timed to gather a steady and continuous stream of monitoring data from multiple DBMS servers. The stream of monitoring data is written to a dedicated system database where systolic set-based operations are implemented to analyze and process the inflow of monitoring data. Monitoring data is written to the system database in discrete packets with embedded transactional data markers to permit set-based processing of monitoring data without the overhead of traditional database transactions or locks. Performance metrics and alert conditions evidenced in the monitoring data are permanently recorded in the system database, and alert conditions are queued for electronic notifications. Built in monitoring scripts and related instructions are stored in the system database to monitor for common DBMS events and conditions. Additional monitoring scripts can be defined to satisfy specialized DBMS monitoring needs without further programming. A user interface is provided for system configuration, operation and for running reports. Multiple systems can operate together with cooperative load balancing and automatic failover. The disclosed methods and apparatus thus yield a scalable, comprehensive and automated system for monitoring a plurality of DBMS servers.

A network monitoring system may be employed for monitoring networked computers and other connected hardware as further described below:

1. Parallel monitoring processes are implemented as asynchronous threads that query and measure the operational status of multiple monitored targets simultaneously. Each monitoring process operates independently of all other neighboring processes and is therefore not delayed or disrupted by the wait states of neighboring process threads. The wait state of each monitoring process is significant because each monitoring process must wait for a remote monitored target to respond to a query, and the monitoring engine leverages these wait states as opportunities to launch additional monitoring processes that query additional monitored targets. The multi-threaded design of the monitoring engine leverages all available computing power, and the total number of monitoring processes that can be instantiated by a single monitoring agent is therefore limited only by the ability of the underlying host computer to initialize and manage threads.

2. Precision thread timing is implemented to distribute and stagger the execution of monitoring scripts evenly over time and to consequently generate and write a steady stream of monitoring data to the system database without data volume spikes that would otherwise occur. Each parallel monitoring process runs in a loop and queries a designated monitored target at a periodic monitoring interval, and each parallel monitoring process is also assigned a relative offset within the monitoring interval such that all multiple parallel monitoring processes execute their monitoring queries at different absolute times. For example, the monitoring engine described below may monitor 1,200 DBMS servers every 30 seconds by arranging each of the 1,200 overlying parallel monitoring processes to execute their queries 25 milliseconds apart within the 30 second monitoring interval. This distribution of query executions over time creates a steady and even stream of monitoring data and minimizes data volume spikes that might otherwise overwhelm the receiving system database server.

3. Systolic set-based processes are implemented within the system database as a series of SQL commands that sequentially analyze and process monitoring data in the manner of a bucket-brigade. Each SQL command performs a dedicated data processing step and moves monitoring data to another data table for additional processing by a subsequent step, until all steps have completed and the original monitoring data is discarded. Each SQL command performs only a single step in the overall process but, importantly, operates against all monitoring data available for the current step. These systolic processes therefore leverage the native ability of the underlying system database server to perform a sequential set of simple operations against larges numbers of records simultaneously and at high speed.

4. The parallel monitoring processes write monitoring data to the system database in the form of transactional data packets to support set-based systolic processing of monitoring data without the overhead of traditional database transactions or locks. The transactional data packets of the present invention refer to a collection of row and column markers that uniquely identify a single packet of monitoring data containing the complete result of a single monitoring query executed against a single monitored target. Each transactional data packet defines a set of monitoring data that must be analyzed and processed as a single unit of work. The systolic set-base processes utilize these packet row and column markers to maintain transactional consistency while processing monitoring data without database transactions or locks.

5. Load balancing, failover and self-monitoring are implemented such that multiple monitoring engines may operate together for additional scalability and fault tolerance. Each monitoring system process is coordinated and managed by a monitoring engine thread, and every thread affirms it operational health by continually updating a heartbeat value within the system database. Each monitoring engine examines the available heartbeat data continually to identify, load balance and failover all other monitoring engines running within a common environment. Each additional monitoring engine added to a common environment thus extends the overall scalability and fault tolerance of the overall monitoring system.

6. Monitoring instruction and monitoring script tables are implemented within the system database to automate and schedule all system monitoring and notification activities as discussed more fully below.

7. Monitoring history tables are implemented within the system database to provide a complete history of the current and historical alert conditions, notifications and other useful metrics for all monitored targets as discussed more fully below.

8. Additional logic is implemented to support a variety of notification scheduling options with contact grouping, escalation and rotation as discussed more fully below.

The monitoring engine as described more fully below, is implemented as any suitable, secure, automated process, such as a Windows Service or Unix daemon, running on a host computer to provide continuous and unattended monitoring of monitored targets in accordance with the monitoring instruction and monitoring script tables. Monitoring data is written to a dedicated system database and electronic notifications are issued per the notification scheduling options, also stored in the system database. Monitoring data is additionally displayed in a user interface program, running on one or more computers, that retrieves monitoring data from the system database without a connection to the monitored targets.

A database monitoring system as described below includes one or more monitoring engines running on one or more computers, a monitoring system database running on a DBMS server, and one or more user interfaces running on one or more computers;

Wherein each monitoring engine:
  Runs on a computer as an unattended process, such as a Windows service or Unix daemon, that starts automatically when the host computer is powered on and that restarts automatically to recover from failures.
  Reads detailed monitoring instructions and monitoring scripts from the system database.
  Implements parallel monitoring processes as asynchronous threads to monitor a plurality of monitored targets remotely over a computer network.
  Queries the operational health of each monitored target continuously in a loop at a pre-defined monitoring interval.
  Distributes and staggers the execution of all monitoring queries by all monitoring processes throughout the monitoring interval to generate a steady and even stream of monitoring data.
  Connects to each monitored target using the native connection protocol of the monitored target.
  Interrogates each monitored target using the native command language of the monitored target.
  Requires no additional software or hardware to be installed on the monitored targets.
  Queries each monitored target to measure the status, performance, capacity, security, command history, schema changes, internal error conditions, custom error conditions or other conditions of each monitored target.
  Writes monitoring data to the system database in the form of transactional data packets to facilitate systolic set-based processing of monitoring data.
  Implements parallel system processes as asynchronous threads that continually execute a series of SQL commands within the system database to analyze and process the inflow of monitoring data in a systolic set-based manner.
  Implements parallel system processes as asynchronous threads that continually execute a series of SQL commands within the system database to manage other monitoring system processes including resource scheduling, electronic notification, electronic response and other internal monitoring system processes.
  Implements an master parallel system process as an asynchronous threads that manages all other monitoring engine processes and that also communicates with the system database to coordinate load balancing, failover and self-monitoring activities with all other monitoring engines.

Wherein the system database:
  Implements monitoring instruction tables to control and automate all processes implemented by all monitoring engine monitoring processes.
  Implement monitoring script tables to store monitoring scripts that are executed by monitoring engines to query monitored targets.
  Implements systolic processing tables and systolic SQL stored procedures to carry out systolic set-based processing of monitoring data in the form of transactional data packets without the overhead of traditional database transactions or locks.
  Implements monitoring and history tables to store the current and historical status, performance, capacity, security, command history, schema changes, internal error conditions, custom error conditions or other conditions of all monitored targets.
  Implements data tables and SQL stored procedures to facilitate additional data processing related to resource scheduling, electronic notification, electronic response and other internal monitoring system processes.
  Implements data tables and stored procedures to support monitoring engine load balancing, failover and self-monitoring.

Wherein each user interface:
  Implements computer input screens to populates all monitoring instruction tables and monitoring script tables and other system database tables to control the monitoring system.
  Displays on-screen monitoring data drawn from the system database without connecting to the monitored DBMS Servers.

Implements an asynchronous process thread that runs in a loop to monitor the system database heartbeat data and to issue alerts and on-screen warnings for any monitoring engine processes that fail to properly update their respective heartbeat data values.

DETAILED DESCRIPTION OF THE INVENTIONS

The present disclosure of networked server monitoring techniques is presented using SQL database servers as examples only. The disclosed methods and apparatus may be applied to any suitable server or collection of servers or combination of servers and other networked hardware and may be implemented with any programming or command language, any server connection protocol and or relational data store, or any other suitable hardware and software.

Figure 1:
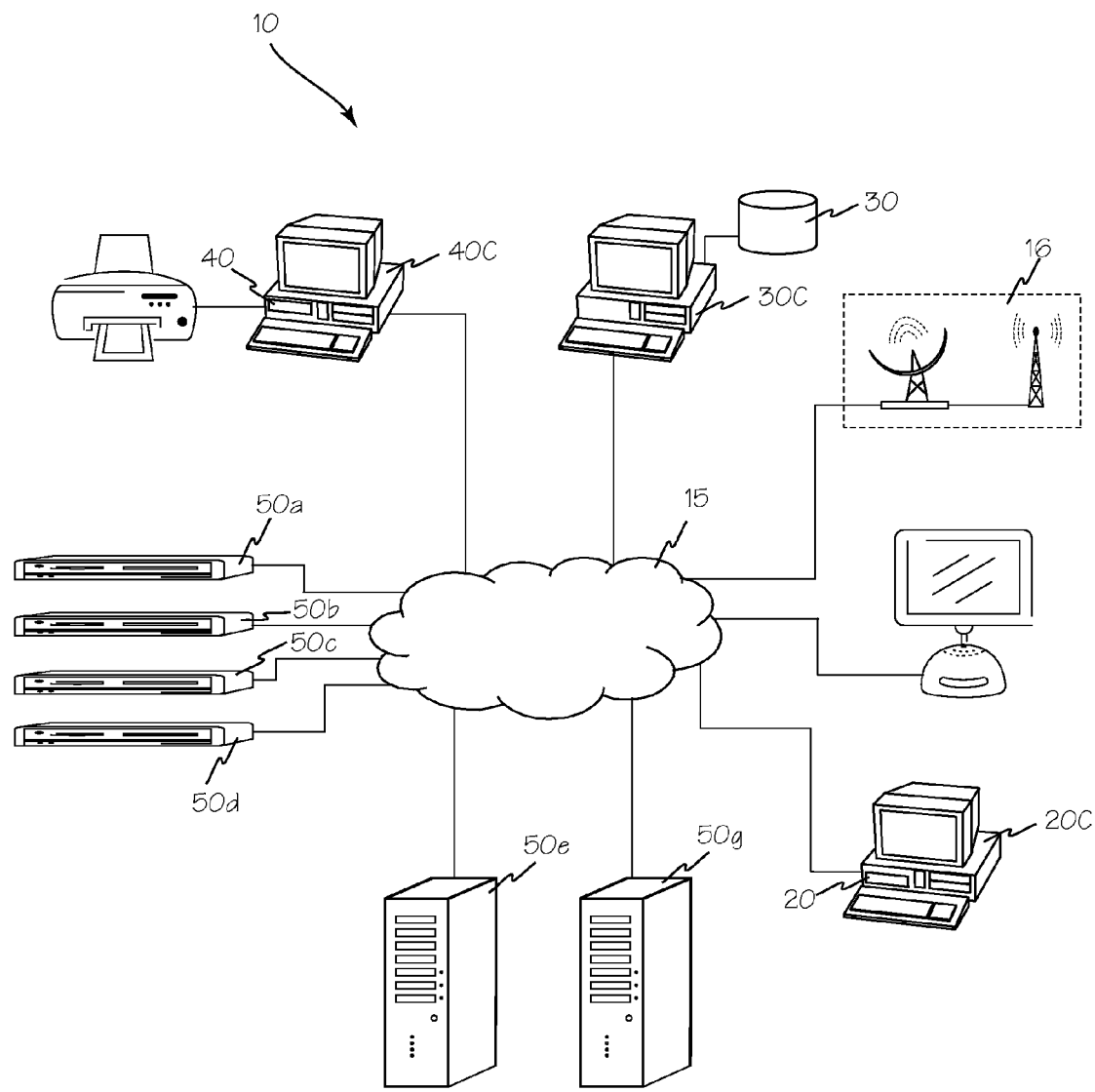
FIG. 1 is a high level block diagram of monitoring system for network database servers.

FIG. 1 is a high level block diagram of server monitoring system 10 which includes one or more monitoring engines such as monitoring engine 20 running on a computer such as first computer 20C, a system database 30 running on a computer such as second computer 30C, and a user interface 40 running on a computer such as third computer 40C to remotely monitor one or more servers such as servers 50a, 50b and 50c across network 15 and provide alerts and status via either third computer 40C or remote notification system 16.

Figure 2:
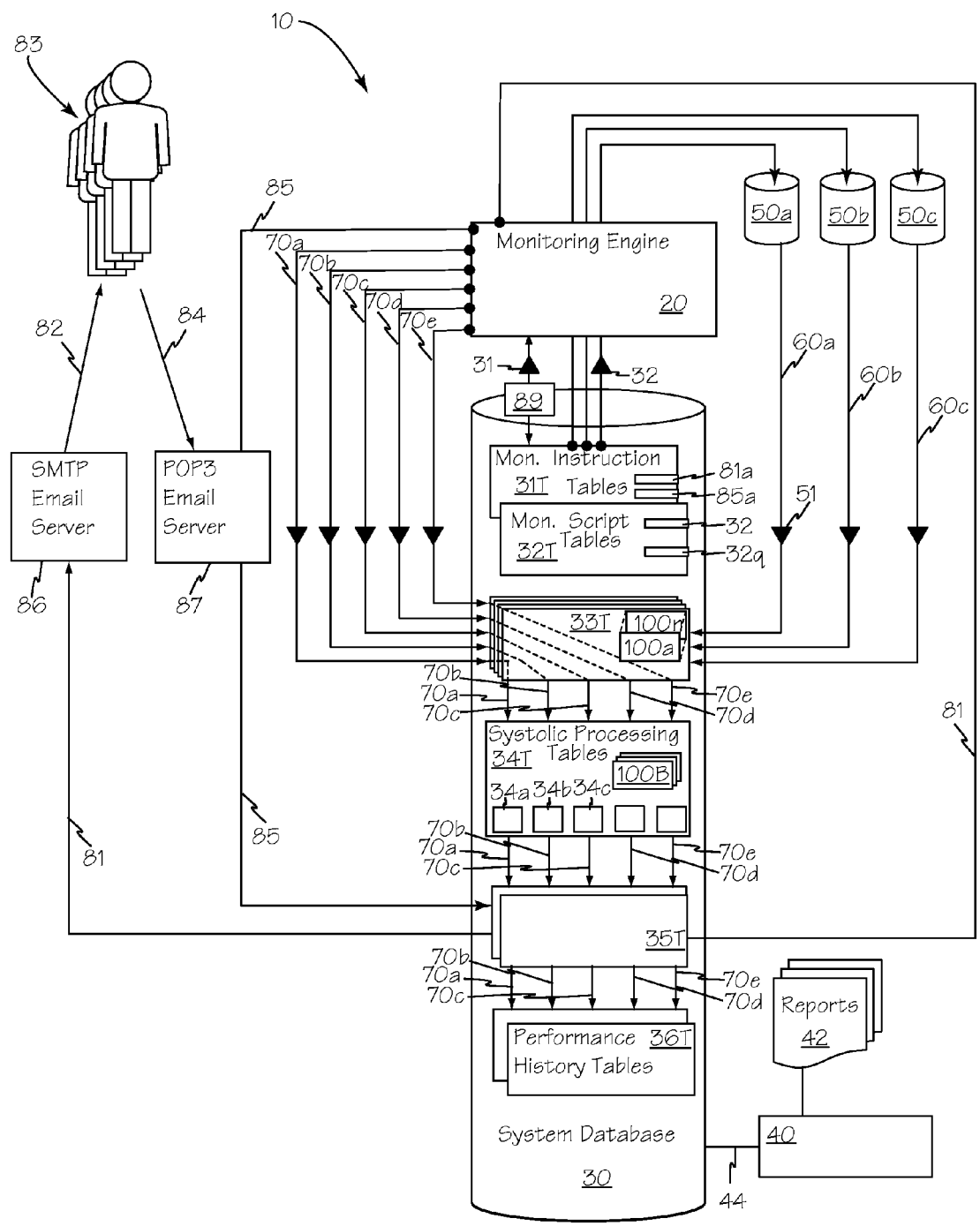
FIG. 2 is a functional block diagram of a method and apparatus for monitoring network database servers.

Referring to FIG. 2, server monitoring system 10 includes one or more monitoring engines such as monitoring engine 20, a system database such as system database 30, and a user interface such as interface 40 to remotely monitor one or more servers such as servers 50a, 50b and 50c across network 15. Monitoring engine 20 reads monitoring instructions such as monitoring instructions 31 and monitoring scripts 32 from system database 30 and executes the monitoring scripts 32 against one or more monitored servers such as DBMS servers 50a, 50b and 50c as prescribed by the monitoring instructions 31 to measure the availability, status, performance, capacity, security, command history, schema changes and internal error conditions of each monitored DBMS server. The system database 30 is implemented on a dedicated DBMS server. The user interface 40 is provided to configure and operate the monitoring system 10 and to run various reports 42 describing the current and historical availability, status, performance, capacity, security, schema change, command history and internal error conditions of the monitored DBMS servers.

Monitoring engine 20 employs multiple parallel monitoring processes 60 to monitor a plurality of DBMS servers such as servers 50a, 50b and 50c simultaneously. Each monitoring process such as process 60a operates asynchronously in a continuous loop and executes one or more monitoring scripts 32 against a single DBMS server at periodic intervals. The parallel monitoring processes are precision timed to distribute the execution of monitoring scripts 32 evenly over time and thus collect a steady and continuous stream of monitoring data from the monitored DBMS servers. Monitoring data 51 is returned from the monitored DBMS servers such as server 50a and written by the parallel monitoring processes 60a to the monitoring data load tables 33T in the system database 30. Each monitoring process writes monitoring data to the load tables 33T with transactional data markers 51M to identify related discreet subpackets of data such as data subpackets 100a-100n that must be combined and henceforth be treated as a single transactional unit, a data packet such as data packet 110. Each transactional data packet 110 stores the complete result of a single monitoring script 32 executed against a single monitored DBMS server 50.

Monitoring engine 20 employs additional system processes 70 that analyze the monitoring data 51 to determine the availability, status, performance, capacity, security, command history, schema changes and internal error conditions of every monitored DBMS server 50. The system processes 70 employ the overlying system database engine 30 to process monitoring data 51 for all monitored DBMS servers simultaneously using systolic set-based data operations. Dedicated processing tables 34T provide each system process such as processes 70a and 70b with dedicated work space. Transactional data packets such as data packet 110 permit system processes 70 to perform set-based analysis of monitor data 51 without the overhead of traditional database server transactions or locks and provides other data processing efficiencies as described below. The system processes 70 store summarized performance metrics in the performance history tables 36T for every monitored DBMS server 50 to support various reports 42. Alert conditions such as, for example, status, performance, capacity, security, command history, schema changes, internal error conditions and or custom error conditions evidenced in the monitoring data 102a and 102b are written by the system threads 70 to the alert and notification tables 35T of the system database 30 and are queued for electronic notification 82 by the notification process 81. A notification response process 85 is provided for system users 83 to suppress notifications 82 selectively for specific alert conditions. The notification process 81 and response process 85 are governed by data-driven scheduling instructions such as instructions 81a and 85a stored in the monitoring instruction tables 31T.

Monitoring scripts such as script 32 are written in the native command language of each monitored DBMS server, or other server, such as servers 50*a*, 50*b* and 50*c* and are stored in the system database 30 monitoring script tables 32T for easy modification. Built in monitoring scripts such as script 32 are provided to monitor for a wide range of common DBMS server events and conditions. Additional monitoring scripts such as custom script 32*q* may be defined to satisfy the specialized monitoring needs of specific DBMS servers or any other servers without further programming.

Dedicated engine process 89 continuously communicates with the system database 30 to identify and execute changes made in the monitoring instruction tables 31T. The engine process 89 also coordinates multiple monitoring engines such as engine 20, which can operate together with cooperative load balancing and automatic failover. The system process 89 performs additional self-monitoring tasks to ensure overall system integrity.

Figure 3:
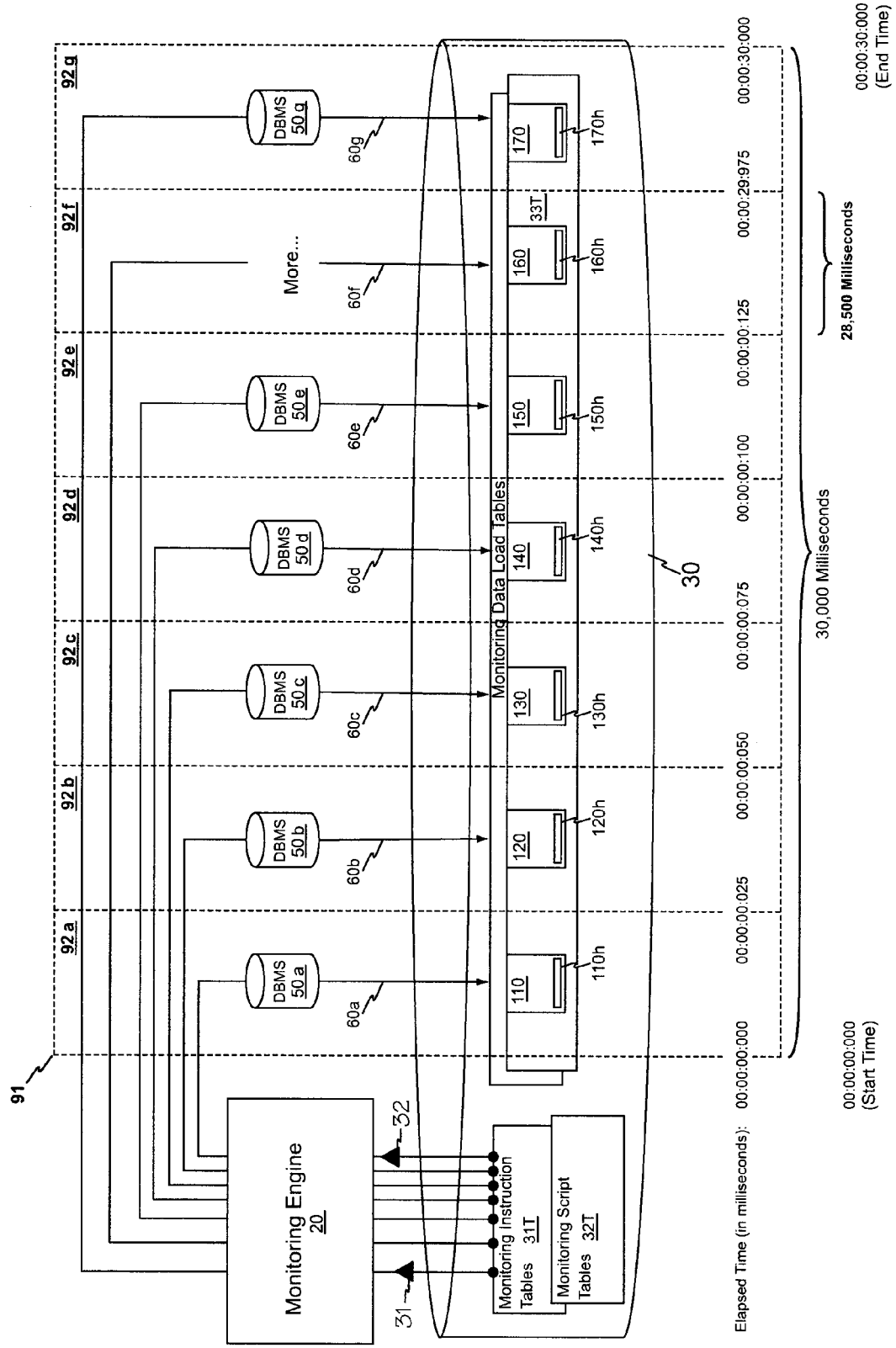
FIG. 3 is a functional block diagram illustrating parallel monitoring processes with precision thread timing.

Self Monitoring, Load Balancing and Failover are achieved by maintaining a set of heartbeat data such as heartbeat data 110*h* in the system database monitoring data tables 33T as illustrated in FIG. 3. Every process or thread within the monitoring system is executed by a monitoring engine thread, and every thread affirms its operational health by continually updating a timestamp within a thread heartbeat table. The monitoring engine continually examines the heartbeat data to validate the health of every process or thread and to identify other monitoring engines running in the same environment. Monitoring engines use the heartbeat data to issue system alerts and notifications in the event of thread failures to implement self monitoring. Monitoring engines also use the heartbeat data to automatically balance the work load among multiple engines for load balancing, and to cover for other monitoring engines that fail providing a failover function.

Parallel Monitoring Processes

Referring to FIG. 2, one or more monitoring engines such as monitoring engine 20 run on a single computer and employ multiple parallel monitor threads 60*a*-60*n* to monitor a plurality of DBMS servers 50*a*-50*n* remotely over a network. Each monitoring process such as process thread 60*a* is implemented as an independent and asynchronous thread of execution and therefore does not disturb the operation or timing of neighboring monitor threads 60*b*-60*n* and system threads 70*a*-70*n*. Each monitoring thread connects to a single monitored DBMS server and runs in a perpetual loop, executing a series of monitoring scripts such as script 32 against the designated DBMS server at regular periodic intervals as prescribed by the monitoring instruction tables 31T. Monitoring data 51 is returned from monitored DBMS server 50*a* and written to the system database 30 monitoring data load tables 33T in the form of transactional data packets such as data packet 100A, described more fully below, for subsequent analysis and processing by the system threads 70*a*-70*n*. Monitoring scripts 32 are defined and executed in the native command language of each monitored DBMS server 50 to gather performance metrics by the most direct and efficient means. The monitoring scripts 32 are executed on and by the monitored DBMS servers 50 and each monitored DBMS server 50 therefore lends its own processing power to the overall monitoring system 10. Many monitoring processes such as process 60*a* can therefore be executed in parallel, and the parallel nature of the monitoring processes ensures that errant or slow responding DBMS servers will not disturb the execution or timing of neighboring monitor threads 60*b*-60*n* and or system threads 70*a*-70*n*.

Precision Thread Timing

Monitoring engine 20 maintains precision control over the execution times of every monitoring process 60 to collect and store a steady and continuous stream of monitoring data from the monitored DBMS servers 50. Each monitoring process 60 is assigned a specific and recurrent execution time at which to execute its monitoring scripts 32, and the execution times of all monitoring processes 60 are staggered evenly over time to regulate the overall flow of the monitoring data stream and spread the data transfer and processing load. Any other suitable distribution of the transfer and processing load may be implemented.

Referring now to FIG. 3, parallel monitoring processes 60 and precision thread timing are further illustrated. In this example, grid 91 represents a monitoring interval of thirty seconds to illustrate how twelve hundred parallel monitoring process threads such as process threads 60*a*-60*n* may be precision timed to distribute the execution of their monitoring scripts such as monitor script 32 against twelve hundred monitored DBMS servers 50*a*-50*n* evenly throughout a thirty second monitoring interval. In this representation, grid columns 92*a* through 92*e* and 92*g* each represent a single twenty-five millisecond period of time, during which a single monitoring process 60 executes monitoring scripts 32 against a designated DBMS server 50. Grid column 92*f* is necessarily collapsed to conserve drawing space and represents an additional series of eleven hundred ninety four consecutive time periods of twenty-five milliseconds each. Monitoring process 60*f* represents the corresponding eleven hundred ninety four monitoring processes that are precision-timed to execute their monitoring scripts 32 consecutively within these intervals. Each monitoring process 60 runs in a perpetual loop and executes its monitoring scripts 32 against a designated DBMS server 50 every thirty seconds. Every DBMS server 50 is therefore monitored once every 30 seconds, and in this example about twelve hundred DBMS servers 50 may be monitored in parallel by a single monitoring engine 20. Monitoring processes such as monitor process 60 execute their monitoring scripts 32 exactly twenty-five milliseconds apart and therefore write a steady and continuous stream of monitoring data 51 to the system database load tables 33T without spikes in data volume that would otherwise occur and overwhelm the system. The number of DBMS servers 50 that can be monitored simultaneously by a single monitoring engine 20 is limited only by the capacity of the underlying hardware. The number of monitoring engines that can be added to the system for additional scalability is limited only by the capacity of the underlying system database to receive and process the steady inflow of monitoring data provided by the monitoring engines.

Systolic Set-Based Operations

Systolic Set-Based Operations refer to a series of SQL stored procedures within the System Database that analyze and process the monitoring data like a bucket-brigade. Each stored procedure or system process, such as system processes 70*a*-70*n*, performs a dedicated step in the process and then moves the monitoring data to the next table for additional processing in a subsequent step. Each stored procedure operates against all data currently available for the step. This "bucket-brigade" design leverages the native ability of commercial DBMS engines to execute simple logic against large numbers of records simultaneously.

Referring again to FIG. 2, the monitoring engine 20 employs set-based system processes such as system processes 70*a*-70*n* that run in perpetual loops to analyze and summarize the continual inflow of monitoring data 51 written by the parallel monitoring processes 60*a*-60*n* to the system database load tables 33T. Each system process 70 utilizes the overlying system database server 30 to perform set based operations and thus processes all available monitoring data for multiple DBMS servers 50 simultaneously. Each system process 70 achieves additional efficiencies by dividing its work into a series of simpler systolic operations. Each systolic operation performs only a single work step in the overall data processing but operates simultaneously on all data for all DBMS servers 50 presently available for the work step.

Figure 6:
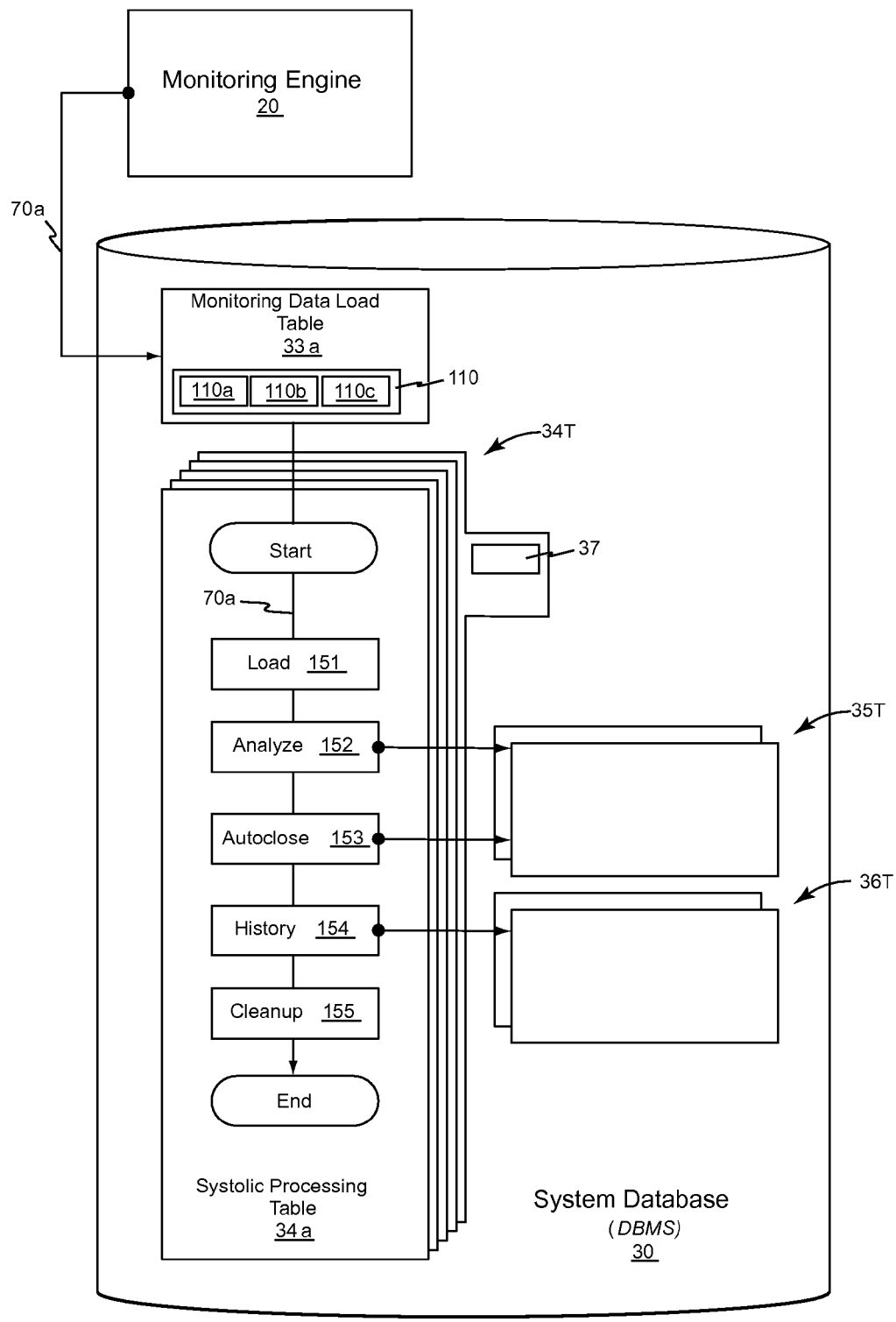
FIG. 6 is a functional block diagram of a systolic process.

Referring to FIG. 6, the operation of a single systolic set based system process 70a is illustrated. In this example, system process 70a processes monitoring data, transactional data packet 110, which is composed of subpackets 110a, 110b and 110c, from load table 33a using several systolic set based operations, represented by work steps 151 through 155. Each work step 151 through 155 employs the overlying system database engine 30 to perform set-based operations against all monitoring data available for each work step. First, in load work step 151, system process 70a moves all available monitoring data out of load table 33a and into processing table 34a. Second, in Analyze work step 152, system process 70a examines all available monitoring data in process table 34a to identify new alert conditions evidenced in the monitoring data. New alert conditions are written to the alert and notification tables 35T and queued for electronic notification. Third, in Autoclose work step 153, system process 70a examines all available monitoring data in process table 34a and alert tables 35T to identify open alert conditions that are no longer evidenced in the monitoring data. These alert condition are marked as closed in the alert tables 35T to suppress further notification, and a permanent record of each alert condition is retained. Fourth, in History work step 153, system process 70a examines all available monitoring data in process table 34a and writes various summarized performance metrics for every monitored server to the performance history tables 36T. Fifth, in Cleanup work step 155, system process 70a deletes current work data in process table 34a to prepare for the next processing cycle of system process 70a. Where necessary, the systolic process may also store recently processed monitoring data values in systolic processing tables 34T such as marker values 37. Such marker table values are useful for determining the uniqueness of monitoring events reflected in the monitoring data and for calculating net changes to monotonically increasing values.

Figure 7:
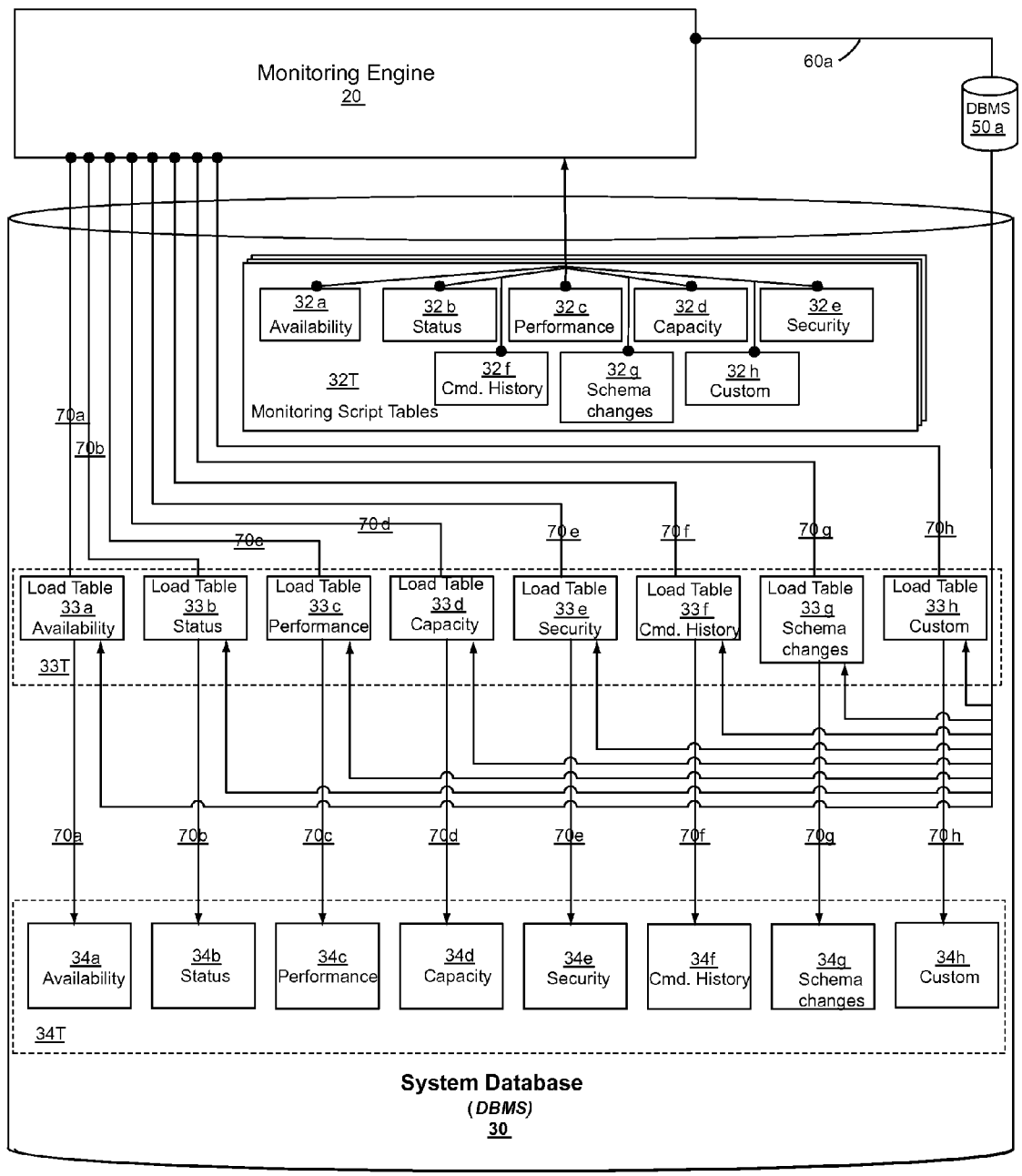
FIG. 7 is a functional block diagram of separate systolic processes for multiple monitoring script types.

The diagram of FIG. 7 further illustrates how separate system processes 70a-70n are employed to support different types of monitoring scripts for additional parallelism. In this example, monitoring process 60a reads several different monitoring scripts 32a through 32e from monitoring script table 32T and executes the monitoring scripts 32 against a single monitored DBMS server 50a. Monitoring process 60a writes the result from each type of monitoring script 32 into separate corresponding load tables 33a through 33e. Dedicated system processes 70a through 70n and process tables 34a through 34n are employed to process data from each load table 33a through 33n separately. In this example separate types of scripts 32 are utilized to monitor DBMS servers for availability 32a, status 32b, performance 32c, capacity 32d, security 32e, command history 32f and schema changes 32g. An additional custom script type 32h is supported to provide user defined monitoring scripts, which need only return a simple error indicator and error message to participate fully in the monitoring system as discussed more fully below.

The systolic processing architecture of the present invention achieves heavy data processing throughput by leveraging the inherent strength of the overlying system database server 30 to perform simple set-based operations on large numbers of data rows simultaneously and at high speed. The division of scripts into separate groups, each managed by a dedicated system process 70 with dedicated load 33 and processing 34 tables, provides additional parallelism by allowing multiple system processes 70 to run simultaneously against separate data tables 33T and 34T.

Transactional Data Packets

Figures 4A, 4B:
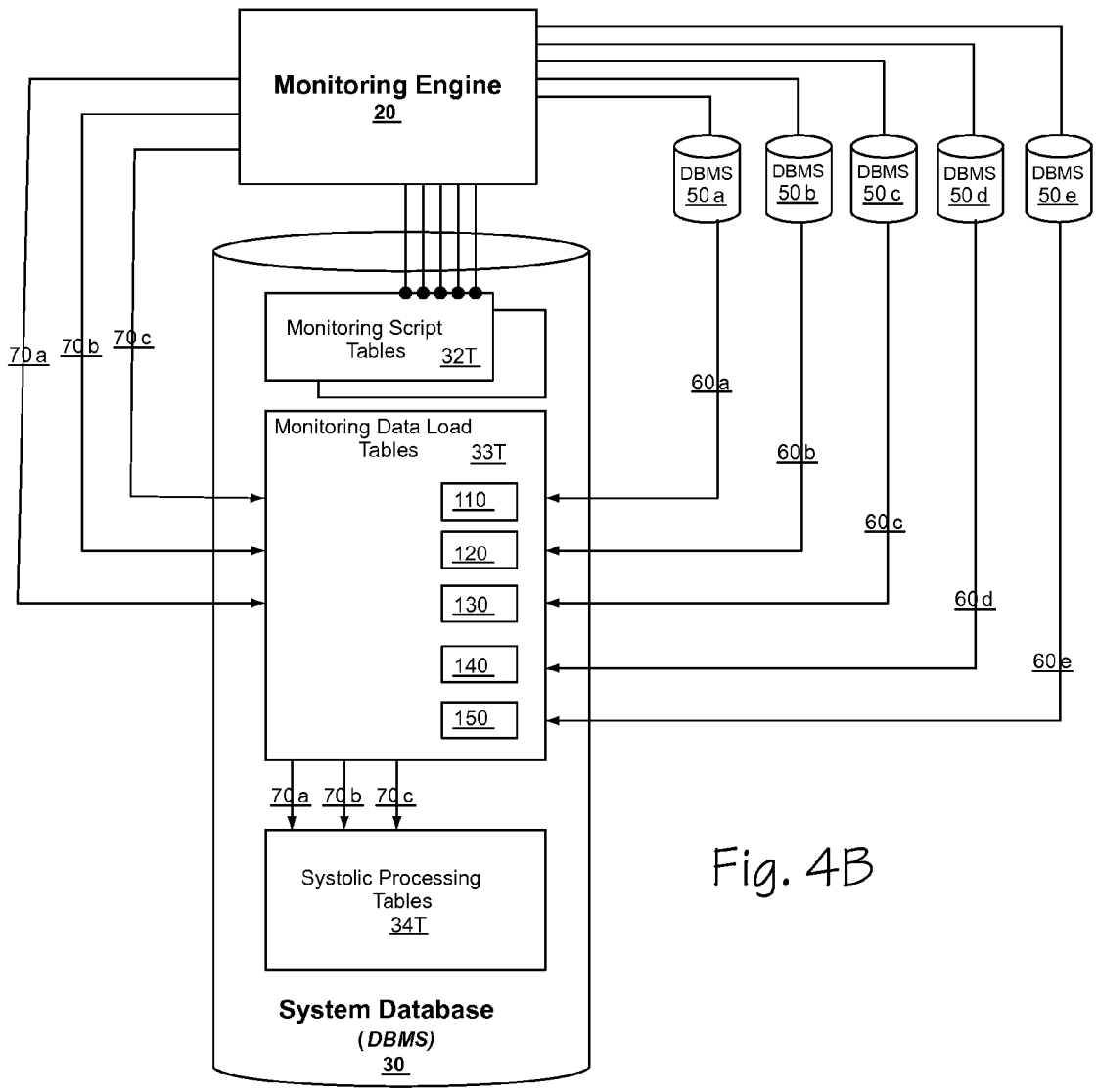
FIGS. 4a and 4b are functional block diagrams illustrating transactional data packets.

Referring to FIG. 4a and FIG. 4b, each monitoring process 60 writes monitoring data to the system database load tables 33T in the form of transactional data packets such as data packet 110, 120, 130, 140, 150, 160 and 170. Each transactional data packet encapsulates monitoring data from a single execution of one monitoring script 32 against one monitored DBMS server 50. Transactional data packets comprise tabular data as would ordinarily be stored in a database table. However, each transactional data packet is written sequentially to contain exactly one header row 101 followed by zero or more data rows 102 followed by exactly one footer row 103. A row type column 105 identifies each row in the packet as a header row 101, data row 102 or footer row 103. A DBMS ID column 106 identifies the monitored DBMS server 50 from which the monitoring data originated. A packet sequence number 107 identifies the order in which each data packet 100 was retrieved from its DBMS server 50. A script ID column 108 identifies the monitoring script 32 that retrieved the monitoring data. Additional columns 109 contain the monitoring data returned by the monitoring script 32 from the monitored DBMS server 50. A completed data packet 100 can therefore be identified by the existence of a single header row 101 and a single footer row 103 with a matching DBMS ID 106, packet sequence number 107 and script ID 108. A valid transactional data packet 100 can contain zero or many data rows 102.

The transactional data packets 100 provide several data processing efficiencies. First, database server 30 transactions and locks would ordinarily be necessary to maintain data consistency as system processes 70 and monitoring processes 60 access the load tables 33T simultaneously; however, transactions and locks are inherently costly and would in this case disrupt the precision timing of the monitoring processes 60, which must execute their monitoring scripts 32 and save their monitoring data to the load tables 33T with millisecond precision as earlier described in reference to FIG. 3 and FIG. 4b. illustrates how system processes 70a-70n examine transactional data packets such as data packet 100 to selectively identify and move completed data packets 110 through 130 out of the load tables 32T and into the processing tables 34T without the use of costly database server 30 transactions or locks; incomplete packets 140 and 150 are left in place while their corresponding monitoring processes 60d and 60e continue to write data. Second, transactional data packets permit the use of sparse monitoring scripts 32 that only return data rows when problem conditions exist on the monitored DBMS server 50. The existence of a complete data packet 100 with zero data rows 102 proves that monitoring script 32 indicated in packet column 108 was in fact successfully executed against the DBMS server 50 indicated in packet column 106 and that no error condition was found when the monitoring script 32 executed. The system processes 70 can therefore use empty data packets 100 to positively confirm that no error exists on the corresponding DBMS server 50 for the corresponding monitoring script 32, and this information can be used to auto close existing alert conditions 35 as previously discussed. Third, sparse monitoring scripts 32 return less monitoring data, exert less overall stress on the monitoring system and thus improve overall system performance. Finally, transactional data packets 100 provide an audit trail throughout the monitoring data; the presence of properly sequenced transactional data packets 100 within the system database 30 can be used to affirm internal system consistency.

Data Driven Monitoring Scripts

Referring again to FIG. 2, the system database 30 stores detailed monitoring scripts and instructions in data tables 32T and 31T to control all monitoring and notification activities for all monitored DBMS servers 50. Monitoring scripts such as script 32 are written in the native command language of each monitored DBMS server 50 and are stored in the system database 30 for easy modification. Built-in monitoring scripts 32 are provided to measure the availability, status, performance, capacity, security, command history, schema changes and error conditions of monitored DBMS servers. Monitoring scripts 32 can be changed and extended to accommodate the nuances of individual monitored servers 50, and entirely new monitoring scripts 32 can be introduced to support specialized DBMS monitoring needs. New monitoring scripts 32 need only return a simple set of prescribed data elements to integrate fully with the system. A user interface 40 is provided for system configuration. The present invention can therefore be configured and extended to fully automate a comprehensive range of specialized DBMS monitoring activities without additional programming.

Referring to FIG. 7, monitoring scripts 32 are organized according to the structure of their return data. Scripts that return similar data structures can be processed by the same system processes 70 and supporting data tables 33T and 34T. A wide range of monitoring scripts 32 can therefore be supported by a single system process such as process 70a. For example, the present monitoring system supports a custom script type 32e that only returns a simple error indicator and error message. One skilled in the art will immediately appreciate that a nearly unlimited range of custom monitoring scripts can be written to fit this simple requirement, thus greatly extending the monitoring functionality of the present invention.

User Interface—Self Monitoring and Secure Monitoring?

Referring again to FIG. 2, user interface 40 implements an asynchronous process thread such as thread 44 to retrieve and display monitoring data from the system database and to examine the heartbeat records for all monitoring engines processes as in reports 42. This provides two benefits. First, every running copy of the user interface assists with self-monitoring because the user interface will display system errors if any process threads fails to affirm their health in the heartbeat tables. This feature provides a "last line of defense" for self-monitoring. Second, monitoring system 10 is secure because every database professional that runs a copy of user interface 40 is pulling monitoring data from system database 30 without connecting to the monitored servers.

Built In DBMS Monitoring Scripts

Referring again to FIG. 7, built-in monitoring scripts 32a through 32g contain pre-written SQL commands and queries to measure common SQL Server events and conditions that ordinarily require the attention of a database administrator 83. With regard to DBMS server 50a, the SQL commands and queries of built-in monitoring scripts 32a through 32g may include the following:

SQL commands that establish a network client connection to verify that DBMS Server 50a is online and available for client connections;

SQL commands and queries that return basic system data to verify that DBMS Server 50a is responding to SQL queries;

SQL commands and queries that inspect the status of every database managed by DBMS server 50a to verify that every managed database is online and available to client applications;

SQL commands and queries that inspect internal system tables to identify internal errors on DBMS Server 50a;

SQL commands and queries that identify failed SQL jobs on DBMS Server 50a;

SQL commands and queries that identify blocked process chains on DBMS Server 50a;

SQL commands and queries that identify high-cost SQL processes on DBMS Server 50a;

SQL commands and queries that identify low data space conditions on DBMS Server 50a;

SQL commands and queries that identify low log space conditions on DBMS Server 50a;

SQL commands and queries that identify low disk space conditions on DBMS Server 50a;

SQL commands and queries that identify low memory conditions on DBMS Server 50a;

SQL commands and queries that identify excessive user connection on DBMS Server 50a;

SQL commands and queries that identify excessive transaction counts on DBMS Server 50a;

SQL commands and queries that identify excessive disk read counts on DBMS Server 50a;

SQL commands and queries that identify excessive disk write counts on DBMS Server 50a;

SQL commands and queries that identify database replication distribution latency on DBMS Server 50a;

SQL commands and queries that identify database replication log reader latency on DBMS Server 50a;

SQL commands and queries to identify low cache hit ratios on DBMS Server 50a;

SQL commands and queries to identify low cache page life expectancy on DBMS Server 50a;

SQL commands and queries that identify security events and system logons on DBMS Server 50a;

SQL commands and queries that identify recent commands executed on DBMS Server 50a;

SQL commands and queries that identify schema changes on DBMS Server 50a.

Custom monitoring scripts 32h are also supported as previously discussed, and monitoring scripts 32a through 32g may be parameterized to support individual alert thresholds for individual servers. Server monitoring threshold data for individual servers is stored in monitoring instruction tables 31T.

One skilled in the art will appreciate that built-in scripts 32a through 32d constitute a thorough and comprehensive test of overall DBMS server health for a SQL Server such as 50a, that variations of these scripts can be implemented as custom scripts such as script 32e to satisfy a nearly unlimited range of specialized monitoring needs of specific database servers on any DBMS server platform, and that thresholds can be adjusted for individual monitored servers to achieve an ideal level of monitoring for each monitored DBMS server such as DBMS server 50a. Although DBMS monitoring scripts are elaborated upon herein, those skilled in the art will also appreciate that similar sets of scripts can be developed to provide built-in and custom monitoring for any type of server on any commercial platform using any server connection protocol and command language. The present server monitoring technique can thus be extended to provide a comprehensive, scalable and fully-automated monitoring solution for any DBMS server and for any other server type.

Alert Notification and Response

Referring again to FIG. 2, the notification process 81 delivers electronic notifications 82 to scheduled recipients 83 for each new alert condition created in the alert and notification tables 35T as prescribed by monitoring instruction tables 31T.

The notification response process 85 allows notification recipients 83 to suppress further notifications 82 for specific alert conditions in the alert tables 35T by sending an electronic response 84 to the original notification 82. Email servers 86 and 87 are shown here for illustration purposes, but various other forms of electronic notification and response can be employed. Notification process 81 issues electronic notifications continuously at periodic intervals per the user-defined schedules until the condition goes away or until an actor responds to the electronic notification, at which point the system records the responder-of-record as the owner for that alert.

The system supports multiple overlapping notification schedules with contact grouping, escalation and rotation to mirror how database professionals are commonly scheduled to work in the industry.

Individual server and contact schedules work in tandem with Notification schedules to suppress alerts and notifications during scheduled server and contact down time.

The notification engine automatically escalates the next tiered contact on a Notification Schedule when a scheduled contact is scheduled for downtime.

Data-Driven Load Balancing and Failover

Figure 5:
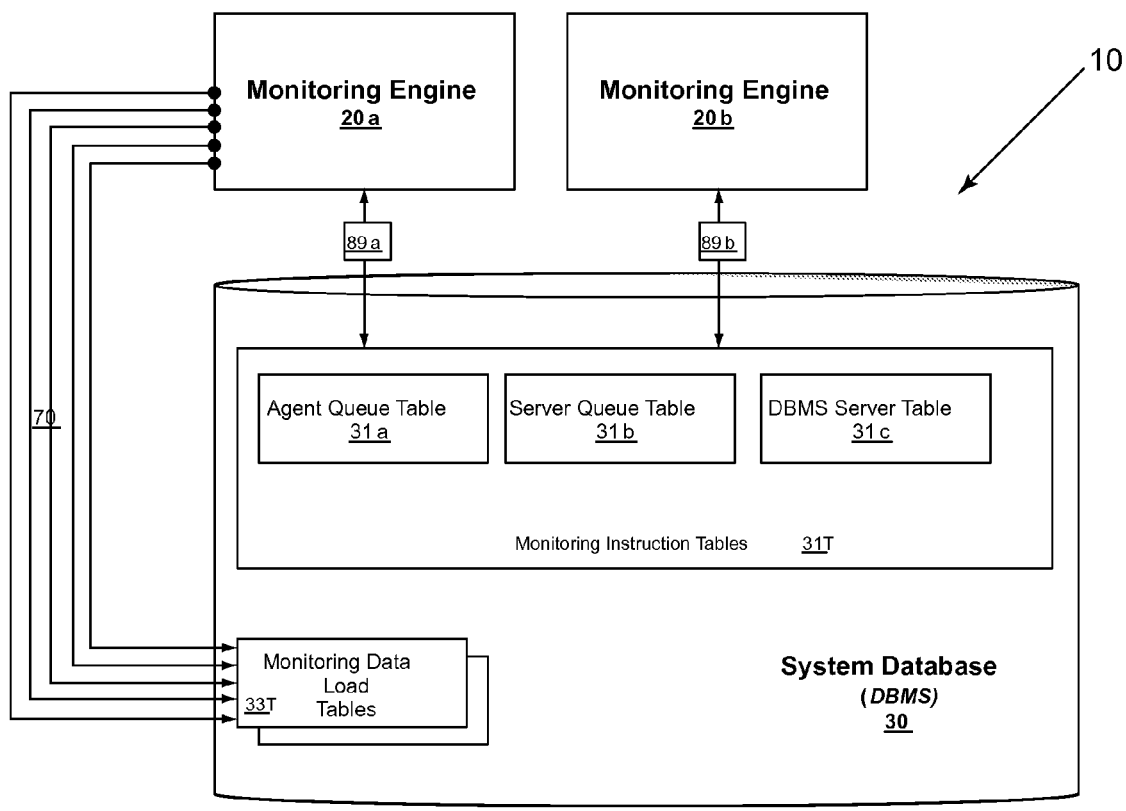
FIG. 5 is a functional block diagram illustrating cooperative load balancing and automatic failover.

Referring to FIG. 5, the present invention employs data driven mechanisms in the system database 30 to support cooperative load balancing and automatic failover when two or more monitoring engines 20 run together within a single monitoring system 10. As shown in FIG. 5, each monitoring engine 20 employs a dedicated process 89 to continually communicate with the engine queue table 31*a*, server queue table 31*b* and DBMS server table 31*c*. Each monitoring engine process 89 continually updates the engine queue table 31*a* to affirm the operational health of its corresponding monitoring engine 20. All monitoring engines 20 continually inspect the queue tables 31*a*, 31*b* and 31*c* to identify all other running engines 20 and to recalculate their equal share of monitored DBMS servers identified in table 31*c* by dividing the number of DBMS servers in table 31*c* by the number of operating engines in queue table 31*a*. If a single monitoring engine 20 fails to affirm its own operational health in the engine queue table 31*a*, the remaining engines will assume the total monitoring workload. At any given time, only one primary monitoring engine 20*a* executes the system processes 70. If a primary engine 20*a* fails to affirm its operational health in the engine queue table 31*a*, the next available engine 20*b* will execute the system processes 70. Separate monitoring engines such as engines 20*a* and 20*b* can run on separate computer systems with independent power feeds to provide high-availability DBMS server monitoring with load balancing and failover for mission critical DBMS applications. In addition, monitoring instruction tables 31T can include additional data to associate specific monitored servers with specific monitoring engines to partition the database enterprise into separate logical domains, each monitored by a designated set of one or more monitoring engines. This feature allows a single monitoring system to monitor database servers across multiple network domains.

Monitoring Engine Process Flow

Figure 8:
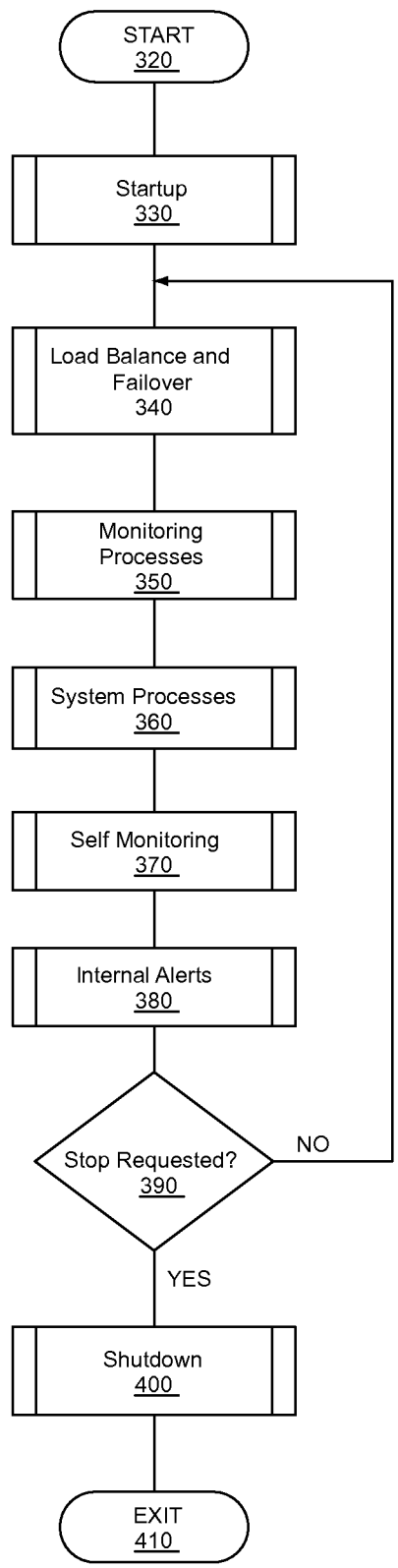
FIG. 8 is a high-level flow chart of the Monitoring Engine.

FIG. 8 is a high-level flowchart of monitoring engine 20. A monitoring engine such as engine 20 is a computer program that consists of an entry point 320, Startup 330, Load Balance and Failover 340, Monitoring Processes 350, System Processes 360, Self Monitoring 370 and Internal Alerts 380. If Stop has NOT been Requested 390, then the monitoring engine will continue processing at Load Balance and Failover 340; otherwise, the Monitoring Engine will call Shutdown 400 and exit 410.

Monitoring Engine Startup Process

The startup process of the monitoring engine enables the unattended nature of the process and the load balance and failover logic. Regarding the unattended nature of the process, the process must be configured to start automatically when the computer on which it runs starts, and, optionally the process must be able to be restarted automatically in the event of a failure: services (Windows) and daemons (UNIX) are two such types of programs that exhibit this capability and any other suitable program may be used. Regarding load balance and failover, every active monitoring engine, such as engine 20 of FIG. 2, must be registered in the system database 30 so that any other engines are aware of their existence and health.

Figure 9:
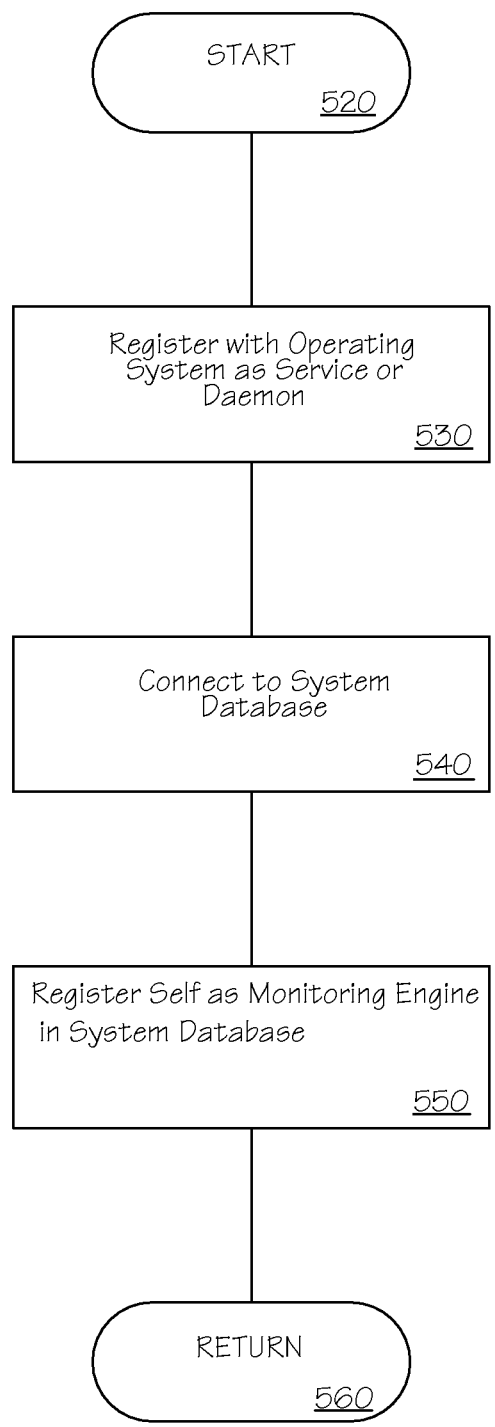
FIG. 9 is a flow chart for a method of the Monitoring Engine startup logic.

FIG. 9 is a flowchart of startup logic step 330 of monitoring engine 20. The startup logic is part of a computer program that will start at the entry point 520, register with operating system as a service or daemon 530, connect to system database at step 540, register itself as a monitoring engine in the system database 30 at step 550 in the monitoring instruction tables 31T, and return control to the calling program 560.

Monitoring Engine Load Balancing and Failover Process

The load balance and failover logic at step 340 accesses information contained in the monitoring instruction tables 31T. The number of active monitoring engines divided by the number of active monitoring targets, servers 50*a*-50*n*, determine the portion of the active monitoring targets that must be monitored by each instance of the monitoring engine 20. In the case of an uneven number of monitoring targets, a primary monitoring engine such as engine 20 will decrease the number of monitoring targets that it will monitor. If a monitor fails, it is considered inactive (see Monitoring Engine Self Monitoring Process below).

Figure 10:
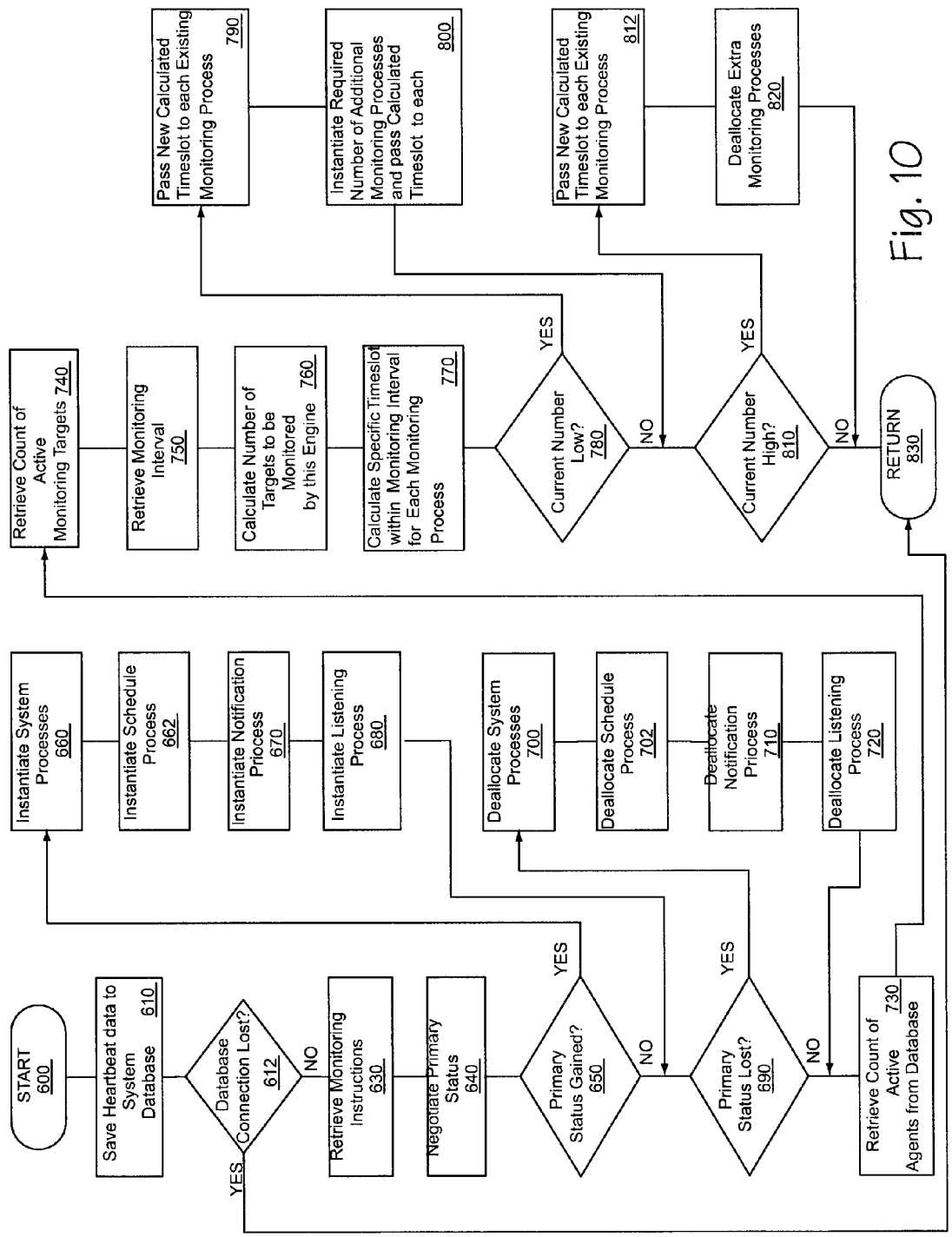
FIG. 10 is a flow chart for a method of the Monitoring Engine load balancing and failover logic.

FIG. 10 is a flowchart of the load balance and failover logic, which is a part of a computer program that will start at the entry point 600, save heartbeat data to system database 610 in the monitoring instruction tables 31T. If connection with the system database has been lost, control is returned to the calling program 830, otherwise, the load balance and failover logic will retrieve monitoring instructions 630 from the monitoring instruction tables 31T, and negotiate for primary status 640 with other registered engines as represented by step 550.

If primary status has been gained 650, the load balance and failover logic will instantiate system processes 660 as parallel asynchronous processes 70*a*-70*n*, instantiate the schedule process 662 as a parallel asynchronous process 70*a*-70*n*, instantiate the notification process 670 as a parallel asynchronous process 70*a*-70*n*, and instantiate the response listening process 680 as a parallel asynchronous process 70*a*-70*n*. If primary status has been lost 690, then the load balance and failover will deallocate system processes 700, deallocate the schedule process 702, deallocate the notification processes 710 and deallocate the response listening processes 720.

Next, the load balance and failover logic will retrieve the count of active engines from the system database 730 from the monitoring instruction tables 31T, retrieve the count of active monitoring targets 740 from the monitoring instruction tables 31T, retrieve the monitoring interval 750 from the monitoring instruction tables 31T, calculate the number of monitoring targets to be monitored by this engine 760, and calculate the specific timeslot within the monitoring interval for each monitoring process 770.

If the current number of monitoring targets being monitored by this engine is lower that the calculated number to be monitored by this engine 780, then the load balance and failover logic will pass a new calculated timeslot to each existing monitoring process 790, instantiate the required number of additional monitoring processes as parallel asynchronous processes 60a-60n, and pass the calculated timeslot and monitoring interval to each additional monitoring process 800. If the current number of monitoring processes is too high 810, then the load balance and failover logic will pass a new calculated timeslot to each existing monitoring process 812 and deallocate the extra monitoring processes 820. At this point, the Load Balance and Failover returns control to the calling program 830.

Monitoring Engine Self Monitoring Process

Self monitoring step 370 is an integral part of the load balance and failover logic of step 340 of monitoring engine 20. If a monitoring engine fails, the remaining monitoring engine(s) must be able to detect this condition and to begin monitoring the monitoring target servers such as servers 50a-50n left unmonitored by the failed monitoring engine. If a primary monitoring engine fails, then, in addition to the unmonitored monitoring targets, one of the remaining monitoring engines must take over the primary status in step 650 and instantiate the internal process steps 660, 662, 670, 680.

Figure 11:
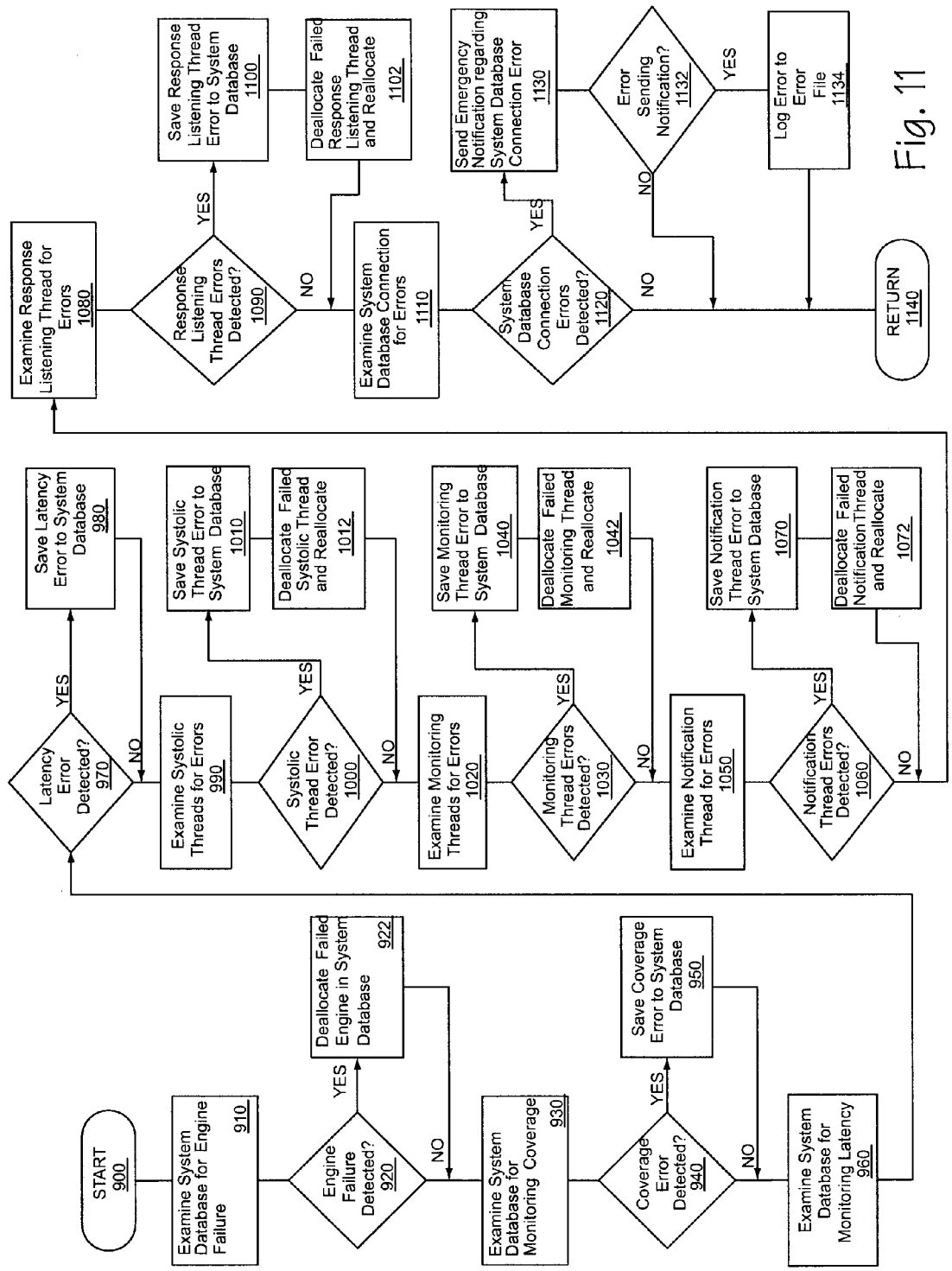
FIG. 11 is a flow chart for a method of the Monitoring Engine self monitoring logic.

FIG. 11 is a flowchart of the monitoring engine self monitoring logic of step 370 of monitoring engine 20. The monitoring engine self monitoring logic is a part of a computer program that will access the monitoring instruction tables 31T. The monitoring engine self monitoring logic will start at the entry point 900, and will examine system database for engine failure 910 in the monitoring instruction tables 31T. If an engine failure has been detected 920, then the monitoring engine self monitoring logic will deallocate the failed engine in system database 922 in the monitoring instruction tables 31T.

Next, the monitoring engine self monitoring logic will examine system database for monitor coverage 930 in the monitoring instruction tables 31T. Monitor coverage means that for each monitoring target such as servers 50a-50n there is an active monitoring process such as processes 60a-60n. If a coverage error is detected 940 (there exists one-or-more active monitoring targets 50a-50n for which there is no active monitoring process such as processes 60a-60n) then the monitoring engine self monitoring logic will save a coverage error to the system database 950 in the alert and notification tables 35T.

Next, the monitoring engine self monitoring logic will examine system database for monitoring latency 960 in the monitoring instruction tables 31T. Monitoring latency is defined as one-or-more process that has not updated the monitoring instruction tables 31T within a pre-defined interval (i.e. 60 seconds). If a monitoring latency error has been detected 970, then the monitoring engine self monitoring logic will save a latency error to system database 980 in the alert and notification tables 35T.

Next, the monitoring engine self monitoring logic will directly examine the systolic threads 70a-70n for errors 990. If a systolic thread error detected 1000, then the monitoring engine self monitoring logic will save systolic thread error to system database 1010 in the alert and notification tables 35T and deallocate-and-reallocate the errant systolic thread 1012.

Next, the monitoring engine self monitoring logic will directly examine monitoring threads 60a-60n for errors 1020. If monitoring thread errors have been detected 1030, then the monitoring engine self monitoring logic will save monitoring thread errors to system database 1040 in the alert and notification tables 35T and deallocate-and-reallocate the errant monitoring threads 1042.

Next, the monitoring engine self monitoring logic will directly examine notification thread 81 for errors 1050. If notification thread errors have been detected 1060, then the monitoring engine self monitoring logic will save the notification thread errors to system database 1070 in the alert and notification tables 35T and deallocate-and-reallocate the errant notification thread 1072.

Next, the monitoring engine self monitoring logic will directly examine response listening thread 85 for errors 1080. If response listening thread error detected 1090, then the monitoring engine self monitoring logic will save response listening thread error to system database 1100 in the alert and notification tables 35T and deallocate-and-reallocate the errant response listening process 1102.

Next, the monitoring engine self monitoring logic will examine system database connection for errors 1110. If system database connection errors are discovered 1120 (i.e. cannot connect to the system database 30), then the monitoring engine self monitoring logic will send an emergency notification regarding the database connection error 1130 via the same mechanism that is employed by the notification thread or process 86. Note that the monitoring engine will continually attempt to re-connect to the system database under all conditions. If the monitoring engine self monitoring logic cannot send the emergency notification 1132, then it will log said error to a file 1134. The monitoring engine self monitoring logic will return control to the calling program 1140.

Monitoring Engine Monitoring Processes

The monitoring engine monitoring process 60 of step 350 utilizes transactional data packets such as packets 100a-100n to move data from the monitoring targets 50a-50n to the monitoring data load tables 33T. A different transactional data packet is used for each monitoring script 32T. The monitoring engine monitoring process is part of the monitor engine computer program, implemented as a parallel asynchronous process that will access the monitoring instruction tables 31T and the monitoring script tables 32T as required.

Figure 12:
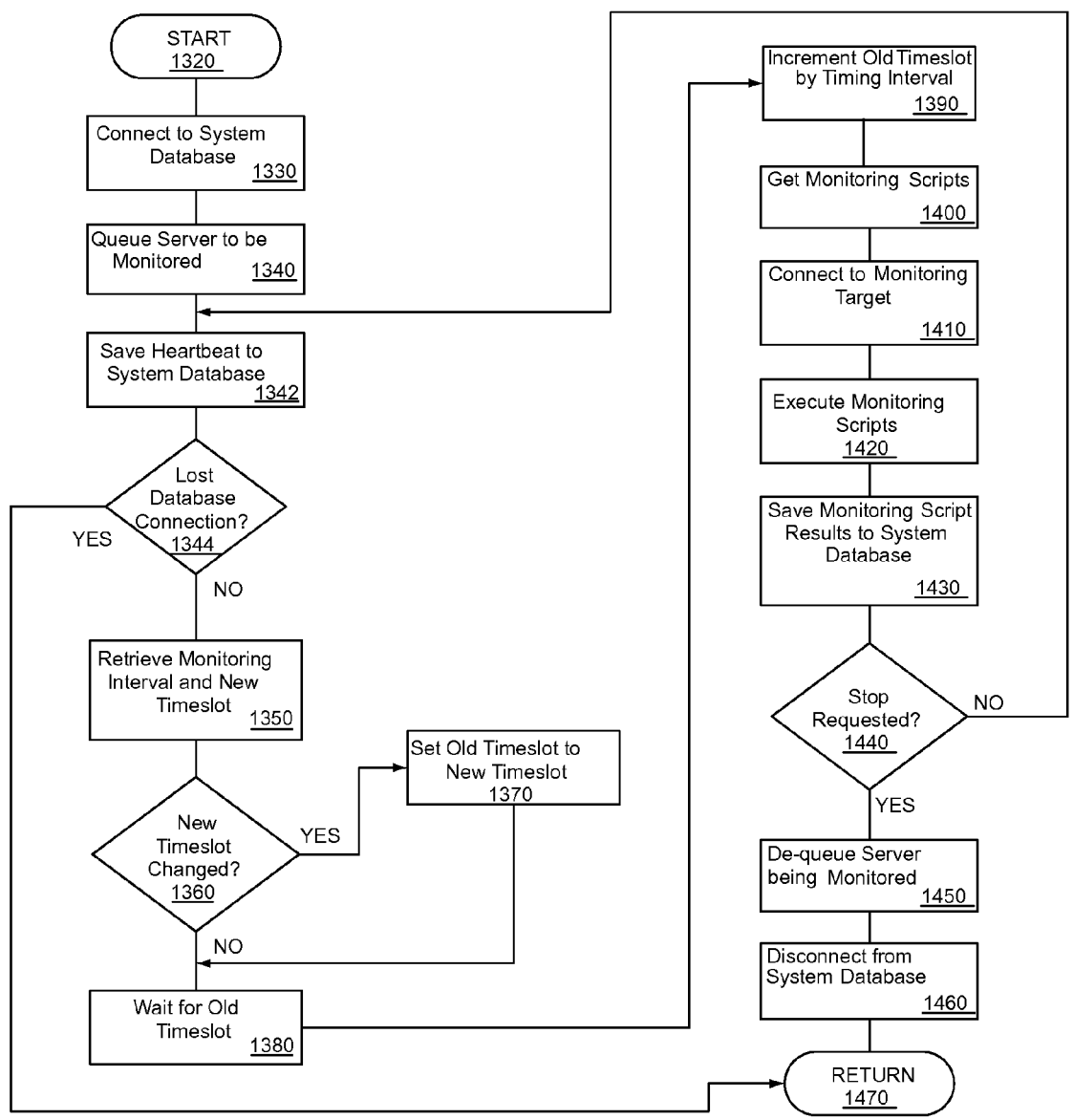
FIG. 12 is a flow chart for a method of the Monitoring Engine monitoring process logic.

FIG. 12 is a flowchart of the monitoring engine monitoring process 60 of step 350. The monitoring engine monitoring process will start at the entry point 1320, connect to the system database 30 at step 1330 and queue a server to be monitored 1340 in the monitoring instruction tables 31T.

Next, the monitoring engine monitoring process will save heartbeat information to the system database 1342 in the monitoring instruction tables 31T. If the connection to the database cannot be re-established 1344 then the monitoring engine monitoring process will register an error and control will be returned to the calling program 1470, else, the monitoring engine monitoring process will retrieve the monitoring interval and the new timeslot 1350 that was passed in from the load balancing and failover logic of step 790. If new timeslot has changed from its original value 1360, then the monitoring engine monitoring process will set the old timeslot value to the new timeslot value 1370.

Next, the monitoring engine monitoring process will wait for the old timeslot to come about 1380 and then increment the old timeslot by timing interval 1390 for the next iteration of the process.

Next, the monitoring engine monitoring process will get monitoring scripts 1400 from the monitoring script tables 32T, connect to monitoring target such as server 50a at step 1410 that was previously queued 1340, execute monitoring scripts 1420 against said monitoring target such as servers 50a-50n, and save the results of the monitoring scripts to the system database 1430 in monitoring data load tables 33T.

Next, if stop has NOT been requested 1440, the monitoring engine monitoring process will continue processing from the point where the heartbeat data is saved 1342. If stop has been requested 1440, then monitoring engine monitoring process will de-queue the server being monitored 1450, disconnect from the system database 30 of step 1460, and return control to the calling program 1470.

Monitoring Engine Systolic Processes

Monitoring engine systolic processes such as process 70*a* of step 360 utilizes transactional data packets such as packets 100*a* to move data from the monitoring data load tables 33T to the systolic processing tables 34T. Each systolic process accesses a different set of tables corresponding to the type of the transactional data packet (FIG. 2, 34*a*, 34*b*, 34*c*, 34*d*. 34*e*, 34*f*, 34*g* and 34*h*). The monitoring engine system process is part of a computer program, implemented as parallel asynchronous processes.

Figure 13:
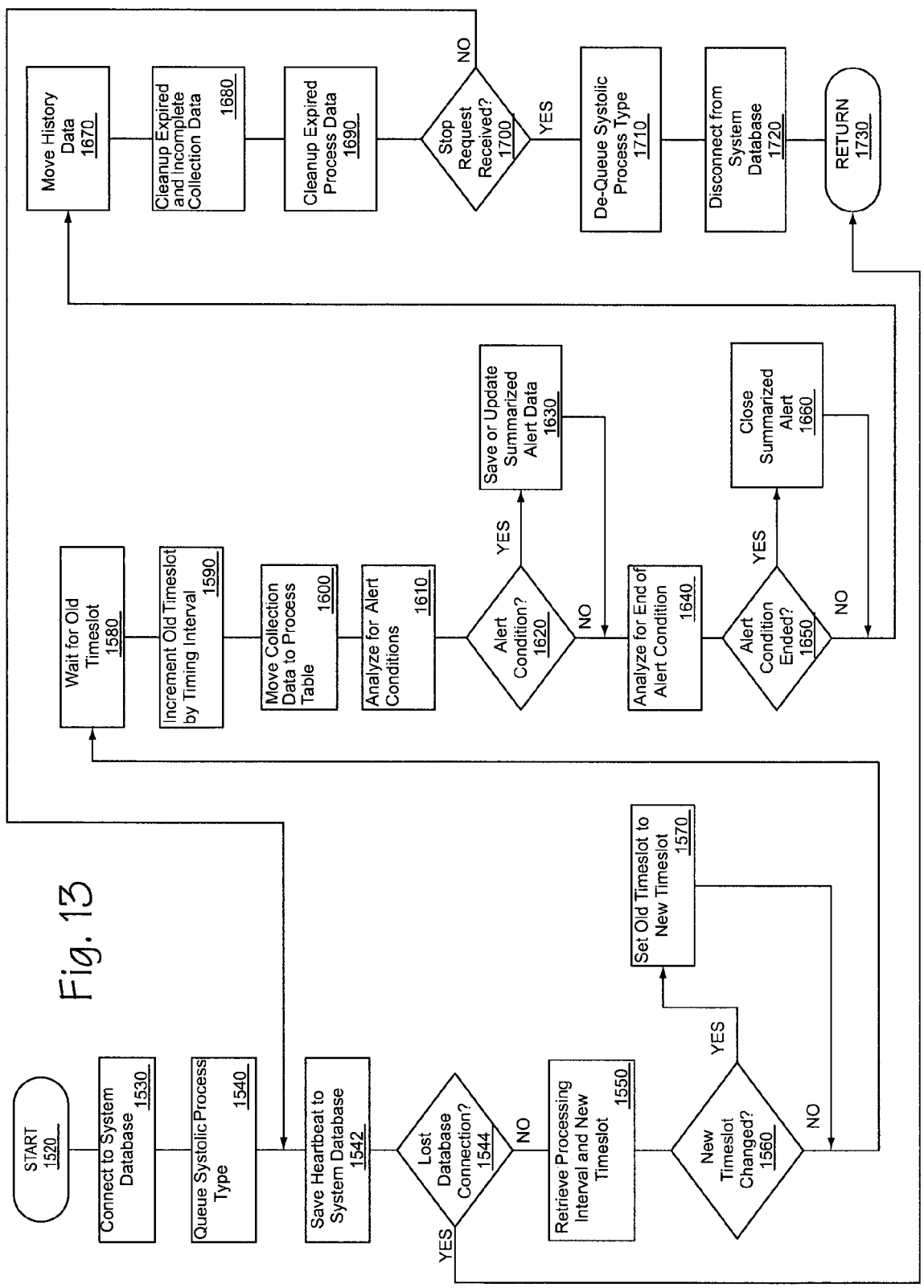
FIG. 13 is a flow chart for a method of the Monitoring Engine system process logic.

FIG. 13 is a flowchart of monitoring engine systolic processes such as process 70*a* of step 360. The monitoring engine systolic process will start at the entry point 1520, connect to the system database 30 at step 1530, queue the systolic process type 1540 in the monitoring instruction tables 31T.

Next, the monitoring engine systolic process will save heartbeat information 1542 in the monitoring instruction tables 31T. If the connection to the system database has been lost 1544, then the monitoring engine systolic process will register an error and return control to the calling program 1730, else, the monitoring engine systolic process will retrieve the processing interval and new timeslot 1550 from the load balancing and failover logic of step 790.

Next, if the new timeslot has changed its value 1560, then the monitoring engine systolic process will set the old timeslot value to the new timeslot value 1570 and wait for the old timeslot value to come about 1580.

Next, the monitoring engine systolic process will increment the old timeslot by the timing interval 1590 for the next iteration of the process.

Next, the monitoring engine systolic process will move collected monitoring data from a monitoring data load table 33T to a systolic processing table 34T of step 1600. Next, the monitoring engine systolic process will analyze the process data 34T for alert conditions 1610. Alert conditions depend on the availability of a Monitoring Target such as servers 50*a*-50*n* as recorded in an availability schedule contained in the monitoring instruction tables 31T which is processed separately (see Monitoring Engine Schedule Process below). If the monitoring engine systolic process detects an alert condition 1620, then the monitoring engine systolic process will save or update summarized alert data 1630 in the alert and notification tables 35T.

Next, the monitoring engine systolic process will analyze for the end of alert conditions 1640 in the alert and notification tables 35T. If the monitoring engine systolic process detects that an alert condition has ended 1650, then the monitoring engine systolic process will close the summarized alert 1660 in the alert and notification tables 35T, move history data 1670 to performance history tables 36T, cleanup expired and incomplete collection data 1680 in monitoring data load tables 33T, and cleanup expired process data 1690 in the systolic processing tables 34T.

Next, if a stop request has not been received 1700, then the monitoring engine systolic process will continue processing from where heartbeat data is saved 1542. If a stop request has been received 1700, then the monitoring engine systolic process will de-queue systolic process type 1710 in the monitoring instruction tables 31T, disconnect from system database 30 at step 1720 and return control to the calling program 1730.

Monitoring Engine Notification Process

Monitoring engine notification process 81 of step 67 is part of a computer program, implemented as a parallel asynchronous process. This process sends electronic notifications to contacts 83 that are recorded in the monitoring instruction tables 31T. The content of the notification is derived from the alert and notification tables 35T. Subject 82 of the notification contains specific markers, which, in the event of a response, can be processed to identify the original alert for which the response has been issued (see Monitoring Engine Response Listening Process below).

Figure 15:
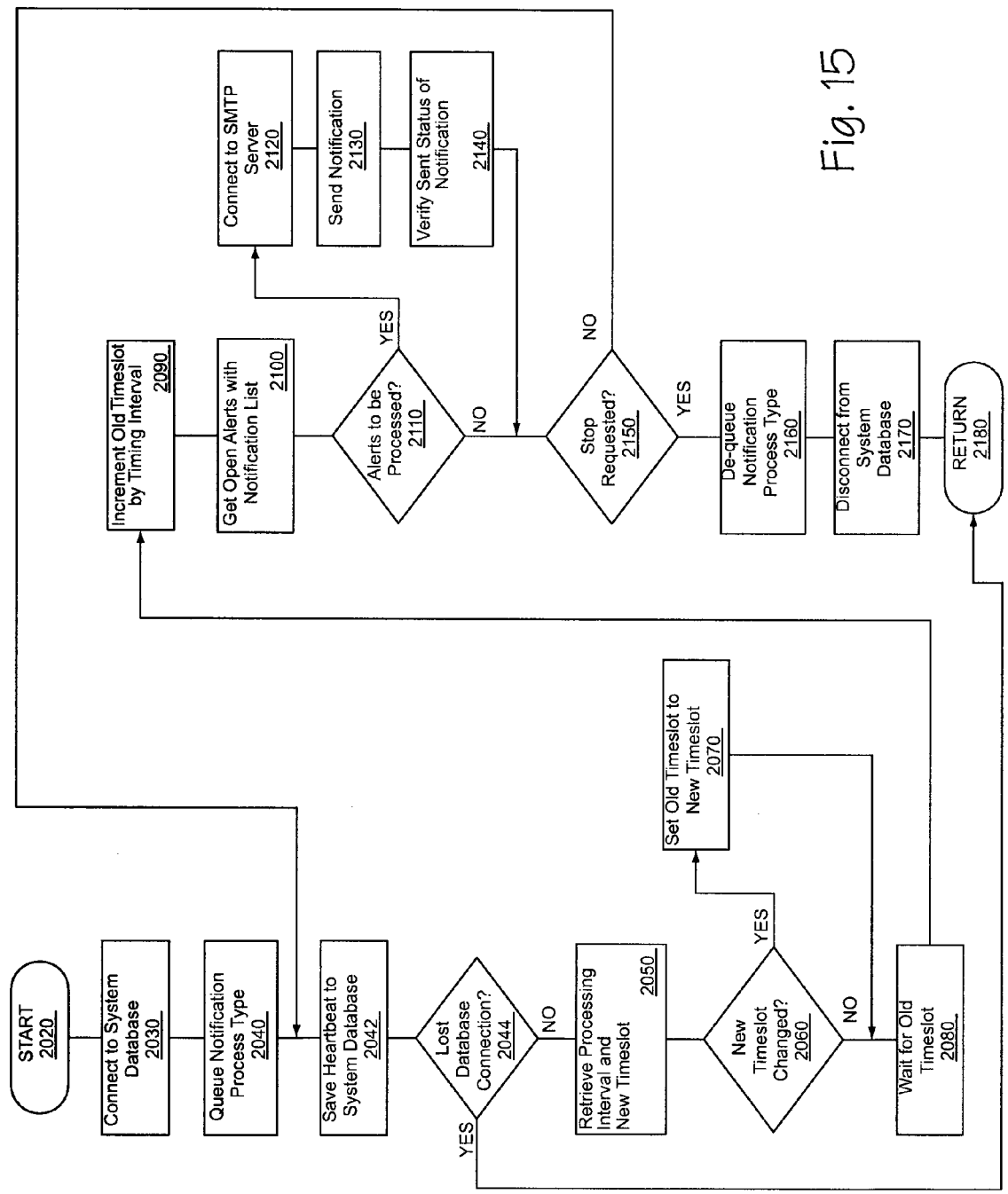
FIG. 15 is a flow chart for a method of the Monitoring Engine notification process logic.

FIG. 15 is a flowchart of monitoring engine notification process 81 of step 670 of monitoring engine 20. The monitoring engine notification process will start at the entry point 2020, connect to the system database 30 at step 2030 and queue the systolic process type 2040 in the monitoring instruction tables 31T.

Next, the monitoring engine notification process will save heartbeat information 2042 in the monitoring instruction tables 31T. If the connection to the system database has been lost 2044, then the monitoring engine notification process will register an error and return control to the calling program 2180, else, the monitoring engine notification process will retrieve the processing interval and new timeslot 2050 from the load balancing and failover logic of step 790.

Next, if the new timeslot value has changed 2060, then the monitoring engine notification process will set the old timeslot value to the value of the new timeslot 2070 and wait for the old timeslot 2080 to come about.

Next, the monitoring engine notification process will increment the old timeslot by the timing interval 2090 for the next iteration of the process.

Next, the monitoring engine notification process will get open alerts with the notification list 2100 from the alert and notification tables 35T. The notification list is contained in the system instruction tables 31T and is controlled by the contact availability schedule (see Monitoring Engine Schedule Process below). If there are alerts to be processed 2110 then the monitoring engine notification process will connect to a SMTP email server 86 at step 2120, send notification(s) to the appropriate contact(s) 2130 and verify the sent status of the notification 2140.

If stop has NOT been requested 2150, then the monitoring engine notification process will continue processing from where heartbeat information is saved 2042; else, the monitoring engine notification process will de-queue the notification process type 2160, disconnect from the system database 30 at step 2170 and return control to the calling program 2180.

Monitoring Engine Response Listening Process

The monitoring engine response listening process 85 of step 680 of monitoring engine 20 is part of a computer program, implemented as a parallel asynchronous process. The monitoring engine response listening process connects to a POP3 email server 87 to retrieve responses to notifications that have been previously sent by the monitoring engine notification process 81 of step 670. Responses are recognized by specific markers in the subject field of the response email 84 that were placed by the monitoring engine notification process 81 of step 670.

Figure 16:
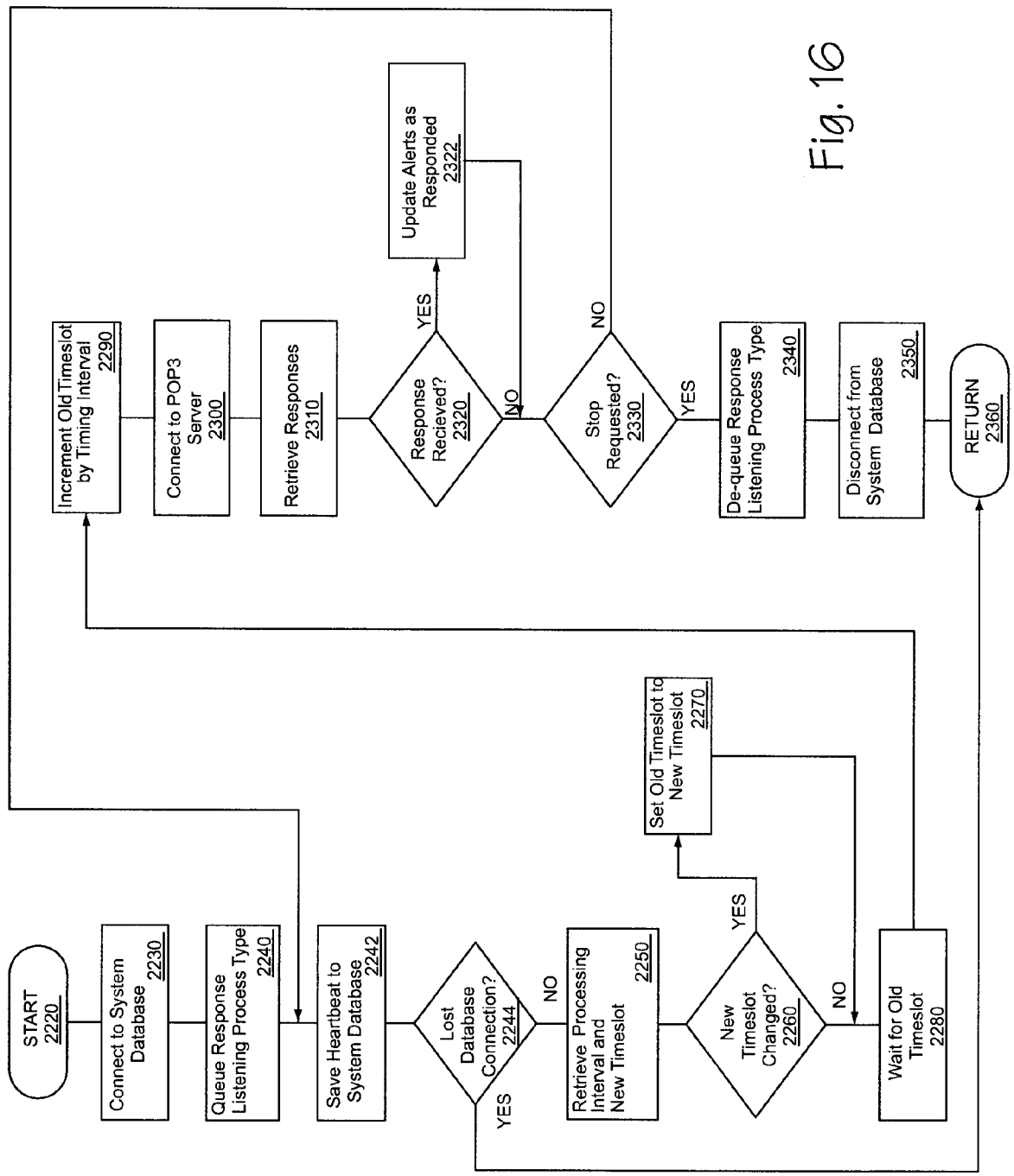
FIG. 16 is a flow chart for a method of the Monitoring Engine response listening process logic.

FIG. 16 is a flowchart of the monitoring engine response listening process 85 of step 680 of monitoring engine 20 of the present invention. The monitoring engine response listening process will start at the entry point 2220, connect to the system database 30 of step 2230 and queue the response listening process type 2240 in the monitoring instruction tables 31T.

Next, the monitoring engine notification process will save heartbeat information 2242 in the monitoring instruction tables 31T. If the connection to the system database has been lost 2244, then the monitoring engine notification process will register an error and return control to the calling program 2380, else, the monitoring engine notification process will retrieve the processing interval and new timeslot 2250 from the load balancing and failover logic of step 790.

Next, if the new timeslot value has changed 2260, then the monitoring engine response listening process will set the value of the old timeslot to the value of the new timeslot 2270 and wait for old timeslot 2280 to come about.

Next, the monitoring engine response listening process will increment the old timeslot by the value of the timing interval 2290 for the next iteration of the process.

Next, the monitoring engine response listening process will connect to a POP3 email server 87 of step 2300 and retrieve any and all responses to alert notifications 2310. If a response has been received 2320, then the response listening process will update alerts as responded 2322 in the alert and notification tables 35T.

If a stop has NOT been requested 2330 then the monitoring engine response listening process will continue processing from where heartbeat information is saved 2242; else, the monitoring engine response listening process will de-queue the response listening process type 2340 in the monitoring instruction tables 31T, disconnect from the system database 30 of step 2350 and return control to the calling program 2360.

Monitoring Engine Schedule Process

The monitoring engine schedule process of step 662 of monitoring engine 20 of the present invention is part of a computer program, implemented as a parallel asynchronous process.

Figure 17:
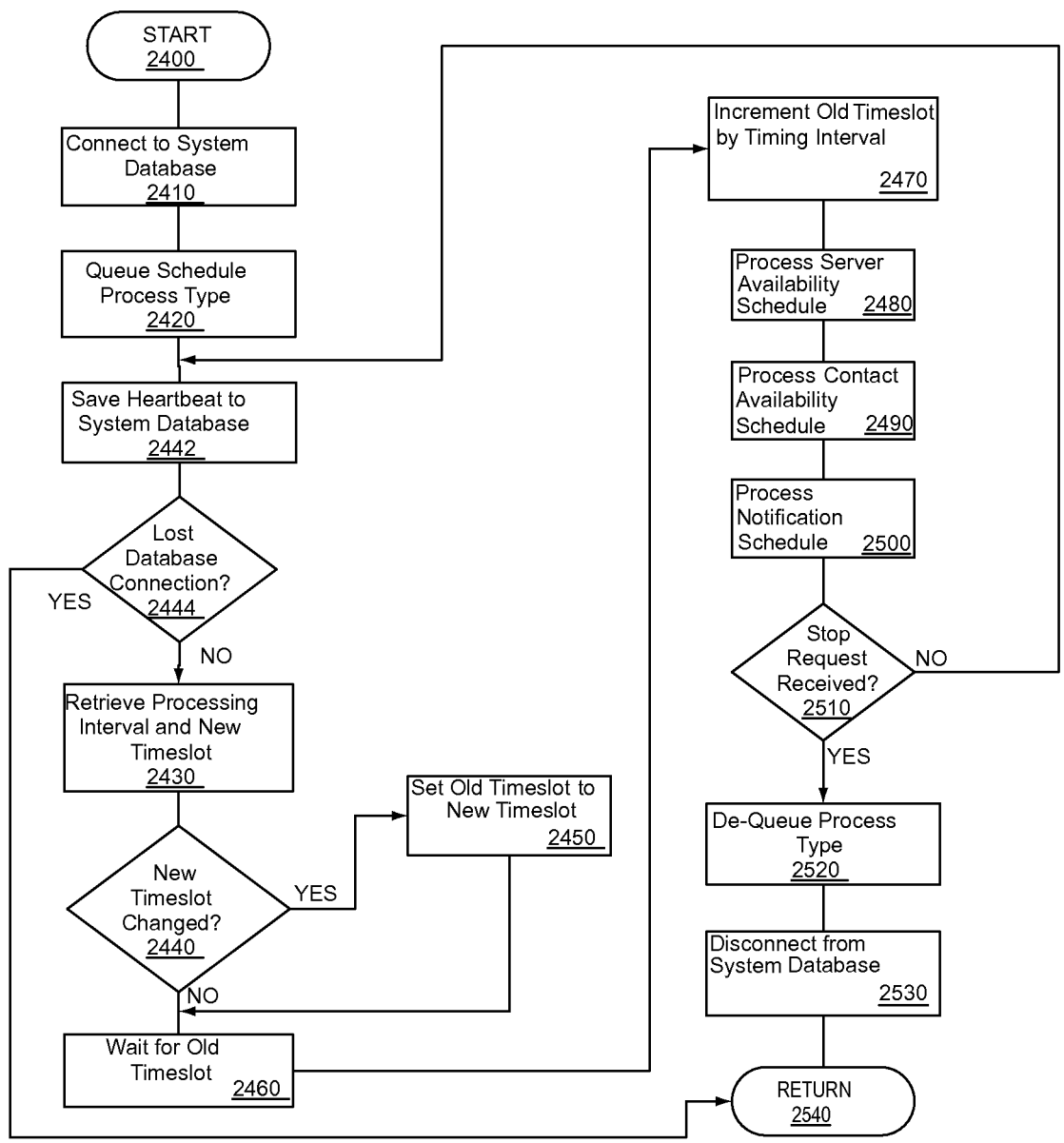
FIG. 17 is a flow chart for a method of the Monitoring scheduling process logic

FIG. 17 is a flowchart of the monitoring engine schedule process of step 662 of monitoring engine 20. The monitoring engine schedule process will start at the entry point 2400, connect to system database 30 at step 2410 and queue the schedule process type 2420 in the monitoring instruction tables 31T.

Next, the monitoring engine schedule process will save heartbeat information 2442 in the monitoring instruction tables 31T. If the connection to the system database has been lost 2444, then the monitoring engine schedule process will register an error and return control to the calling program 2540.

Next, the monitoring engine schedule process will retrieve the processing interval and new timeslot 2430 from the load balancing and failover logic of step 790.

Next, if the new timeslot value has changed 2440, then the monitoring engine schedule process will set the value of the old timeslot to value of the new timeslot 2450 and wait for the old timeslot 2460 to come about.

Next, the monitoring engine schedule process will increment the old timeslot by the value of the timing interval 2470 for the next iteration of the process.

Next, the monitoring engine schedule process accesses monitoring instructions 31T. The server availability schedule of the monitoring instructions 31T provides time-frames in which a given monitoring target such as servers 50a-50n is unavailable for monitoring (i.e. scheduled maintenance). The contact availability schedule of the monitoring instructions 31T provides time-frames in which a given contact is unavailable to receive notifications (i.e. vacation). The notification schedule of the monitoring instructions 31T provides time-frames in which a specific group of contacts such as contacts 83 should be notified of system alerts related to a specific group of monitoring targets; time-frames in which a second specific group of contacts will be notified if the first group fails to respond (escalation); and timeframes in which a second specific group of contacts will be notified in place of the first group for the same group of monitoring targets (rotation). The schedule process places a marker in system tables to indicate the availability and processing sequence of scheduled resources.

Using monitoring instructions 31 the monitoring engine schedule process will then process the server availability schedule 2480, process the contact availability schedule 2490 and process the notification schedule 2500.

If stop has NOT been requested 2510, then the monitoring engine schedule process will continue processing from where heartbeat information is saved 2442; else, the monitoring engine schedule process will de-queue the schedule process type 2520 in the monitoring instruction tables 31T, disconnect from the system database 30 at step 2530 and return control to the calling program 2540.

Monitoring Engine Shutdown Process

The monitoring engine shutdown process of step 400 of monitoring engine 20 is integral to the load balance and failover logic (FIG. 10). A monitoring engine such as engine 20 that has shut down must inform other active monitoring engines of the shutdown event, and of the active monitoring targets 50a-50n that now must be monitored by other monitoring engines. The monitoring engine shutdown process is part of a computer program implemented as an inline callable routine.

Figure 14:
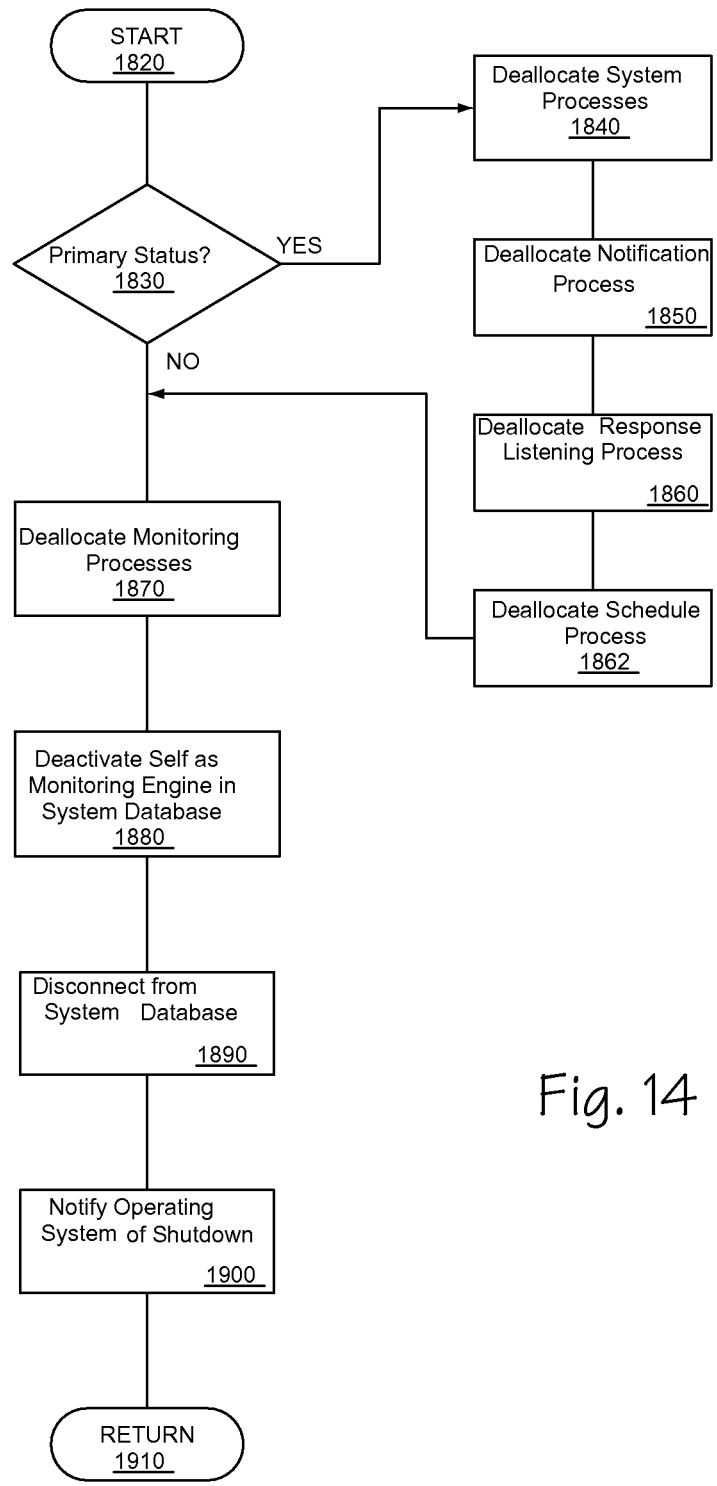
FIG. 14 is a flow chart for a method of the Monitoring Engine shutdown process logic.

FIG. 14 is a flowchart of the monitoring engine shutdown process step 400 of monitoring engine 20. The monitoring engine shutdown process will start at the entry point 1820, and check for primary status 1830 in the monitoring instruction tables 31T. If primary status 1830 is true, then the monitoring engine shutdown process will deallocate systolic processes 1840 70a— 70n, deallocate notification process 1850, deallocate response listening process 1860 and deallocate the schedule process 1862.

Next, the monitoring engine shutdown process will deallocate monitoring processes 1870, deactivate self as a monitoring engine in the system database 1880 in the monitoring instruction tables 31T, disconnect from system database 30 at step 1890, notify the operating system of shutdown 1900 of a service, daemon or other program, and return control to the calling program 1910.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A server monitoring system comprising:
   a computer network including at least one database server and at least one system monitor computer, each of the at least one database servers having a native connection protocol and a native command language;
   a monitoring system database running on at least one of the at least one database servers for storing server, contact and notification schedule data in monitoring instruction tables, and for storing monitoring scripts in monitoring script tables, the monitoring instructions and monitoring scripts for controlling monitoring threads and system threads, and for storing monitor data in monitoring history tables;
   a monitoring engine means running on the at least one system monitor computer for reading monitoring instructions and monitoring scripts from the monitoring system database; and
   interrogating each of the at least one database server using the native connection protocol and the native command language of the database server, and monitoring each of the at least one database servers in a separate asynchronous parallel monitor thread producing monitor data, with the execution of each parallel monitor thread timed relative to previous and subsequent threads to evenly distribute thread execution and data return;

executing system threads as systolic set-based processes on monitor data; and a user interface means for enabling user monitoring of the monitoring engine, population of the monitoring instructions and monitoring scripts and notification of a user of an alert from any of the at least one database servers.

2. The server monitoring system of claim 1 wherein the monitor data further comprises:

current alert data, historical alert data, notification data, availability data, status data, performance data, capacity data, security data, command data, schema change data and internal error data.

3. The server monitoring system of claim 1 wherein the monitor data is provided to the monitoring system database as transactional data packets.

4. The server monitoring system of claim 1 further comprising:

a second monitoring engine means running on another of the at least one system monitor computers or any of the at least one database servers, the second monitoring means and the monitoring means evaluating heartbeat data to determine the operation of the other and to divide the at least one database servers to be monitored between the second monitoring means and the monitoring means.

5. The server monitoring system of claim 1 wherein the monitoring system database further comprises:

heartbeat data from each monitor thread and system thread, the heartbeat data related to each monitor thread and system thread updated during execution of the related monitor thread and system thread.

* * * * *